(12) United States Patent
Bradley et al.

(10) Patent No.: US 12,020,708 B2
(45) Date of Patent: Jun. 25, 2024

(54) METHOD AND SYSTEM FOR CONVERSATION TRANSCRIPTION WITH METADATA

(71) Applicant: SoundHound, Inc., Santa Clara, CA (US)

(72) Inventors: Kiersten L. Bradley, Lafayette, CO (US); Ethan Coeytaux, Boulder, CO (US); Ziming Yin, Toronto (CA)

(73) Assignee: SoundHound AI IP, LLC., Santa Clara, CA (US)

( * ) Notice: Subject to any disclaimer, the term of this patent is extended or adjusted under 35 U.S.C. 154(b) by 306 days.

(21) Appl. No.: 17/450,552

(22) Filed: Oct. 11, 2021

(65) Prior Publication Data

US 2022/0115020 A1     Apr. 14, 2022

Related U.S. Application Data

(60) Provisional application No. 63/198,328, filed on Oct. 12, 2020.

(51) Int. Cl.

| | |
|---|---|
| *G10L 15/26* | (2006.01) |
| *G06F 40/134* | (2020.01) |
| *G06F 40/166* | (2020.01) |
| *G06F 40/284* | (2020.01) |
| *G10L 15/02* | (2006.01) |

(Continued)

(52) U.S. Cl.
CPC ............ *G10L 15/26* (2013.01); *G06F 40/134* (2020.01); *G06F 40/166* (2020.01); *G06F 40/284* (2020.01); *G10L 15/02* (2013.01); *G10L 15/063* (2013.01); *G10L 15/07* (2013.01); *G10L 2015/0631* (2013.01)

(58) Field of Classification Search
CPC ....... G10L 15/26; G10L 15/02; G10L 15/063; G10L 15/07; G10L 2015/0631; G06F 40/134
USPC ........................................................ 704/235
See application file for complete search history.

(56) References Cited

U.S. PATENT DOCUMENTS

| | | |
|---|---|---|
| 6,230,163 B1 | 5/2001 | Thijssen |
| 7,606,444 B1 | 10/2009 | Erol |
| 7,941,317 B1 | 5/2011 | Goffin et al. |

(Continued)

OTHER PUBLICATIONS

Non-Final Rejection by the USPTO for U.S. Appl. No. 16/567,760 dated Jun. 10, 2022.

(Continued)

*Primary Examiner* — Susan I McFadden
(74) *Attorney, Agent, or Firm* — Platinum Intellectual Property PC

(57) ABSTRACT

Methods and systems for enabling an efficient review of meeting content via a metadata-enriched, speaker-attributed transcript are disclosed. By incorporating speaker diarization and other metadata, the system can provide a structured and effective way to review and/or edit the transcript. One type of metadata can be image or video data to represent the meeting content. Furthermore, the present subject matter utilizes a multimodal diarization model to identify and label different speakers. The system can synchronize various sources of data, e.g., audio channel data, voice feature vectors, acoustic beamforming, image identification, and extrinsic data, to implement speaker diarization.

20 Claims, 23 Drawing Sheets
(6 of 23 Drawing Sheet(s) Filed in Color)

(51) Int. Cl.
*G10L 15/06* (2013.01)
*G10L 15/07* (2013.01)

(56) References Cited

U.S. PATENT DOCUMENTS

| | | | |
|---|---|---|---|
| 8,442,197 | B1 | 5/2013 | Mazza et al. |
| 9,639,762 | B2 | 5/2017 | Chakraborty et al. |
| 9,852,732 | B2 | 12/2017 | Chavez et al. |
| 10,546,588 | B2 | 1/2020 | Kofman et al. |
| 10,777,186 | B1 | 9/2020 | Stefani et al. |
| 10,867,610 | B2 * | 12/2020 | Diamant ............... G10L 15/26 |
| 11,036,924 | B2 | 6/2021 | Greenspan et al. |
| 11,076,052 | B2 * | 7/2021 | Cartwright ........... H04L 65/403 |
| 11,431,517 | B1 * | 8/2022 | Lau ...................... G10L 15/183 |
| 11,688,399 | B2 * | 6/2023 | Diamant ............. G06V 40/172 704/200 |
| 2005/0216851 | A1 | 9/2005 | Hull |
| 2007/0011012 | A1 | 1/2007 | Yurick et al. |
| 2007/0071206 | A1 | 3/2007 | Gainsboro |
| 2008/0064326 | A1 | 3/2008 | Foster et al. |
| 2008/0295040 | A1 | 11/2008 | Crinon |
| 2008/0300876 | A1 | 12/2008 | Kashima et al. |
| 2014/0249813 | A1 | 9/2014 | Hoeg |
| 2015/0100315 | A1 | 4/2015 | Bianco |
| 2015/0106091 | A1 | 4/2015 | Wetjen |
| 2016/0217807 | A1 | 7/2016 | Gainsboro |
| 2017/0011740 | A1 | 1/2017 | Gauci |
| 2017/0133007 | A1 | 5/2017 | Drewes |
| 2017/0171600 | A1 | 6/2017 | Casagrande |
| 2017/0310826 | A1 | 10/2017 | Gunasekar |
| 2018/0182385 | A1 | 6/2018 | Stahl |
| 2019/0108834 | A1 | 4/2019 | Nelson |
| 2019/0158927 | A1 | 5/2019 | Catalano et al. |
| 2019/0318010 | A1 | 10/2019 | Tamir et al. |
| 2019/0318725 | A1 | 10/2019 | Roux et al. |
| 2019/0341050 | A1 * | 11/2019 | Diamant ............... H04N 7/155 |
| 2019/0342351 | A1 | 11/2019 | Garrido et al. |
| 2019/0392837 | A1 | 12/2019 | Jung et al. |
| 2020/0175961 | A1 | 6/2020 | Thomson et al. |
| 2020/0175987 | A1 | 6/2020 | Thomson et al. |
| 2020/0327891 | A1 | 10/2020 | Chhabra et al. |
| 2021/0074298 | A1 | 3/2021 | Coeytaux |
| 2021/0135896 | A1 | 5/2021 | Ghanaie-Sichanie et al. |
| 2021/0160242 | A1 | 5/2021 | McKnight et al. |
| 2021/0210072 | A1 | 7/2021 | Parc et al. |
| 2021/0210097 | A1 * | 7/2021 | Diamant ............... H04N 7/147 |
| 2022/0115019 | A1 * | 4/2022 | Bradley ................ G10L 17/00 |
| 2022/0188525 | A1 | 6/2022 | Trim et al. |

OTHER PUBLICATIONS

Microsoft, Presentation Translator for PowerPoint help and FAQs, https://www.microsoft.com/en-us/translator/help/presentation-translator/, pre Jun. 5, 2019.

Moupiya D., Skype to aid real-time transcription and AI captions in early 2019, https://www.techgenyz.com/2018/12/04/skype-real-time-transcription-and-captions/, Dec. 4, 2018.

Tom Warren, Microsoft PowerPoint is getting real-time captions and subtitles for presentations, The Verge, Dec. 3, 2018.

Sinclair, Mark. "Speech segmentation and speaker diarisation for transcription and translation." (2016).

Kalnikaitē, Vaiva, Patrick Ehlen, and Steve Whittaker. "Markup as you talk: establishing effective memory cues while still contributing to a meeting." In Proceedings of the ACM 2012 conference on Computer Supported Cooperative Work, pp. 349-358. 2012.

Bhavik Shah, Build your own Custom Language Model to convert unique Speech to Text, https://www.ibm.com/blogs/watson/2016/09/build-custom-language-model-convert-unique-speech-text/, Sep. 26, 2016.

Amara Graham, Build a custom language model for Watson Speech to Text, https://developer.ibm.com/technologies/speech-and-empathy/tutorials/watson-speech-to-text-custom-language-model/, Jul. 6, 2018.

Anguera, Xavier, Chuck Wooters, and Javier Hernando. "Acoustic beamforming for speaker diarization of meetings." IEEE Transactions on Audio, Speech, and Language Processing 15, No. 7 (2007): 2011-2022.

Shi, Baoxu, and Tim Weninger. "Visualizing the Flow of Discourse with a Concept Ontology." In Companion Proceedings of the The Web Conference 2018, pp. 89-90. 2018.

Peddinti, Vijayaditya, Daniel Povey, and Sanjeev Khudanpur. "A time delay neural network architecture for efficient modeling of long temporal contexts." In Sixteenth annual conference of the international speech communication association. 2015.

Snyder, David, Daniel Garcia-Romero, Daniel Povey, and Sanjeev Khudanpur. "Deep neural network embeddings for text-independent speaker verification." In Interspeech, pp. 999-1003. 2017.

Snyder, David, Daniel Garcia-Romero, Gregory Sell, Daniel Povey, and Sanjeev Khudanpur. "X-vectors: Robust dnn embeddings for speaker recognition." In 2018 IEEE International Conference on Acoustics, Speech and Signal Processing (ICASSP), pp. 5329-5333. IEEE, 2018.

Huang, Zili, Shinji Watanabe, Yusuke Fujita, Paola Garcia, Yiwen Shao, Daniel Povey, and Sanjeev Khudanpur. "Speaker diarization with region proposal network." In ICASSP 2020-2020 IEEE International Conference on Acoustics, Speech and Signal Processing (ICASSP), pp. 6514-6518. IEEE, 2020.

Canseco-Rodriguez, Leonardo, Lori Lamel, and Jean-Luc Gauvain. "Speaker diarization from speech transcripts." In Proc. ICSLP, vol. 4, pp. 3-7. 2004.

François Beaufort, Access USB Devices on the Web, https://developers.google.com/web/updates/2016/03/access-usb-devices-on-the-web, Apr. 16, 2019.

Shafey, Laurent El, Hagen Soltau, and Izhak Shafran. "Joint speech recognition and speaker diarization via sequence transduction." arXiv preprint arXiv:1907.05337 (2019).

* cited by examiner

Slydell: Just a second there, Professor. We, uh, we fixed the glitch. So he won't be receiving a paycheck anymore. So it'll just work itself out naturally.

Porter: We always like to avoid confrontation whenever possible. The problem is solved from here on, then.

[LAUGHTER]

Slydell: Uh, we should move on to a Peter Gibbons. I had a chance to meet this young man and boy does he have Straight to Upper Management written all over him.

Bill: Ooh, uh, yeah. I'm going to have to go ahead and sort of disagree with you there. Yeah. Uh, he's been real flaky lately and I'm not sure that he's the caliber person you want for upper management. He's been having some problems with his teepee as reports.

Porter: I'll handle this.
We feel that the problem isn't with Peter.

Slydell: Um-um.

Porter: It's that you haven't challenged him enough to get him really motivated.

Slydell: There it is.

Bill: Yeah, I'm not sure about that now.

Porter: All right, Bill. Let me ask you this. How much time each week would you say you deal with these teepee as reports?

FIG. 7

```
                         Transcript
1
2   Alice: Hey, tomorrow is Charlie's birthday.
3
4   Bob: What should we do for him?
5
6   Alice: Let's have a cake with those special candles
7   Bob:                              oh yeah, and ice cream.
8
9   Alice: Okay, I'll call the bakery now.
10
```

*FIG. 8C*

Slydell: Just a second there, Professor. We, uh, we fixed the glitch. So he won't be receiving a paycheck anymore. So it'll just work itself out naturally.

Porter: We always like to avoid confrontation whenever possible. The problem is solved from here on, then.

[LAUGHTER]

Slydell: Uh, we should move on to a Peter Gibbons. I had a chance to meet this young man and boy does he have Straight to Upper Management written all over him.

Bill: Ooh, uh, yeah. I'm going to have to go ahead and sort of disagree with you there. Yeah. Uh, he's been real flaky lately and I'm not sure that he's the c[ TPS ]vant for upper management. He's been having some problems with his ▓▓▓▓▓reports.

Porter: I'll handle this.
We feel that the problem isn't with Peter.

Slydell: Um-um.

Porter: It's that you haven't challenged him enough to get him really motivated.

Slydell: There it is.

Bill: Yeah, I'm not sure about that now.

Porter: All right, Bill. Let me ask you this. How much time each week would you say you deal with these teepee as reports?

*FIG. 12*

METHOD AND SYSTEM FOR CONVERSATION TRANSCRIPTION WITH METADATA

CROSS-REFERENCES TO RELATED APPLICATIONS

This application claims the benefit of U.S. Provisional Patent Application No. 63/198,328, entitled "Transcription of Conversation," filed Oct. 12, 2020, which is incorporated herein by reference for all purposes.

TECHNICAL FIELD

The present subject matter is in the field of artificial intelligence systems and Automatic Speech Recognition (ASR). More particularly, embodiments of the present subject matter relate to methods and systems for automatic transcription of a conversation.

BACKGROUND

Speech-to-text transcription has become increasingly important for converting human speech into a text transcript. These transcripts have found great uses in many applications, such as court reporter transcripts, medical reports, company's meeting records, or lecture notes. Trained professionals such as transcriptionists can manually transcribe an audio or video file to a textual transcript or add captions to the audio or video file using tools such as Adobe Closed Captioning Pod.

In recent years, automatic transcription applications have also been developed. It is available in popular products and services such as Microsoft Skype and Google Meet video conference auto-captioning. However, there are a lot of areas for improving the automatic transcription applications.

SUMMARY OF THE INVENTION

The following specification describes many aspects of automatic transcription of conversations and example embodiments that illustrate some representative combinations with optional aspects. Some examples are systems of process steps or systems of machine components for automated transcription of a conversation. These can be implemented with computers that execute software instructions stored on non-transitory computer-readable media.

The present subject matter pertains to improved approaches to transcribe multi-speaker conversations or meetings to a textual transcript with metadata. With incorporated metadata, the enriched transcript can extract the meeting content to allow a reviewer to fully understand an audio recording without listening to it. Furthermore, the incorporated metadata can be, for example, speaker diarization, timestamp markers, text format, embedded hyperlinks, playback controls, static or dynamic image repositories.

In addition, the present subject matter utilizes a multi-modal diarization model to implement speaker diarization. The system can synchronize various sources of data, e.g., audio channel data, voice feature vectors, acoustic beamforming, visual identification, and extrinsic data, to identify and label different speakers.

Furthermore, by adopting one or more domain-specific language models, the present subject matter can improve transcription accuracy. It further enables collaborative editing among multiple editors.

A computer implementation of the present subject matter comprises: receiving audio streams from at least one audio source, generating speech segments by segmenting the audio streams, wherein the segmenting is based on the voice activity detection, generating a plurality of text strings by transcribing the speech segments with a speech recognition system, determining a plurality of speaker identities associated with the plurality of text strings based on a speaker diarization model, assigning respective indicators to the plurality of text strings based on the plurality of speaker identities, wherein text strings associated with one speaker are assigned to the same indicator, and generating a transcript by combining the plurality of text strings associated with the respective indicators.

According to some embodiments, the speaker diarization model can be multimodal and can be configured to utilize or synchronize one or more diarization factors to determine the plurality of speaker identities. Examples of such diarization factors comprise audio channel data, acoustic beamforming data, speaker visual data, speech feature vectors data, visual identification data and extrinsic user data.

According to some embodiments, the method of the present subject matter further comprises determining the distance between the speech feature vectors of a group of speech segments below a threshold and clustering the group of speech segments by assigning the same indicator to the group of speech segments.

According to some embodiments, the method of the present subject matter further comprises: determining a first speech segment overlaps with a second speech segment in time, sending the transcript as text to a visual display with line breaks between speech segments, and reducing the spacing between the text strings associated with the first speech segment and the second speech segment in the transcript.

According to some embodiments, the method of the present subject matter further comprises: embedding hyperlinks within the plurality of text strings, wherein the hyperlinks are associated with corresponding speech segments of the audio streams. By receiving a selected hyperlink associated with a speech segment, a playback of relevant audio streams is possible.

According to some embodiments, the method of the present subject matter further comprises: timestamping the plurality of text strings according to a common clock, storing the timestamps associated with the text strings, receiving a request from an editing application to play audio corresponding to a text string and playing audio beginning at the timestamp corresponding to the requested text string.

According to some embodiments, the method of the present subject matter further comprises: displaying, on a screen, video streams accompanying the audio streams, capturing screenshots of video streams accompanying the audio streams and generating the transcript by combining the plurality of text strings associated with the respective indicators and the screenshots.

According to some embodiments, the method further comprises: detecting pixel changes on the screen displaying the video streams, wherein capturing screenshots is conditional upon the number of pixel changes being greater than a threshold. According to some embodiments, the method further comprises displaying, on the screen, the screenshots of video streams in a grid, wherein the screenshots of video streams are configured to associate with corresponding text strings and to represent the content of the video streams.

According to some embodiments, the method of the present subject matter further comprises: receiving a selection of a screenshot in the grid, displaying the corresponding text strings based on the selected screenshot and playing audio associated with the corresponding text strings.

According to some embodiments, the method of the present subject matter further comprises: capturing a plurality of screenshots of video streams with respective timestamps based on a common clock, generating a plurality of animated video files based on the plurality of screenshots and displaying, on the screen, the plurality of animated videos in a grid, wherein the animated video are configured to associate with corresponding text strings and to represent the content of the video streams.

According to some embodiments, the method further comprises: receiving a selection of an animated video file in the grid, playing the selected animated video file on the screen, playing audio associated with the selected animated video file and displaying, on the screen, the corresponding text strings based on the selected animated video file.

According to some embodiments, the method of the present subject matter further comprises, enabling, via an editing application, a global replacement of a term in the transcript. According to some embodiments, the method further comprises identifying a key phrase within a text string and tagging the key phrase as a hyperlink anchor corresponding to a URL associated with the key phrase.

According to some embodiments, the method of the present subject matter further comprises, including an argument in the URL when text adjacent to the key phrase matches a pattern corresponding to the argument.

According to some embodiments, the method of the present subject matter further comprises: identifying an n-gram text as having a low frequency within a language model and tagging the n-gram text as a hyperlink anchor corresponding to a URL associated with a definition of the n-gram text.

A computer implementation of the present subject matter comprises: receiving audio streams from at least one audio source, generating a plurality of text strings by transcribing the audio streams with a speech recognition system, determining a plurality of speaker identities associated with the plurality of text strings based on a speaker diarization model, assigning respective indicators to the plurality of text strings based on the plurality of speaker identities, wherein text strings associated with one speaker are assigned to the same indicator, capturing screenshots of video streams accompanying the audio streams with timestamps based on a common clock and generating a transcript by combining the plurality of text strings associated with the respective indicators and the screenshots. According to some embodiments, the method further comprises displaying, on a screen, video streams accompanying the audio streams.

A computer implementation of the present subject matter comprises: receiving audio streams from at least one audio source, generating a plurality of text strings by transcribing the audio streams with a speech recognition system, determining a plurality of speaker identities associated with the plurality of text strings based on a speaker diarization model, assigning respective indicators to the plurality of text strings based on the plurality of speaker identities, wherein text strings associated with one speaker are assigned to the same indicator, generating a transcript by combining the plurality of text strings associated with the respective indicators, and enabling a plurality of users to jointly edit the transcript via an editing application.

According to some embodiments, during joint editing of the transcript, the editing application is configured to identify a user with a unique marker displayed on the transcript.

According to some embodiments, the editing application is configured to assign various editing permissions to the plurality of users. According to some embodiments, the editing application is configured to continuously update the transcript according to the audio streams in real-time.

According to some embodiments, the spacing between the text strings indicates an amount of break time between the speech segments. According to some embodiments, the respective indicators comprise at least one of a speaker avatar, a speaker name, or a speaker color. According to some embodiments, the system can display the transcript on a screen and automatically scroll through the planarity of text strings associated with audio streams being played. According to some embodiments, the transcript is continuously updated according to the audio streams in real-time. According to some embodiments, the speech recognition system comprises one or more domain-specific language models.

Other aspects and advantages of the present subject matter will become apparent from the following detailed description taken in conjunction with the accompanying drawings, which illustrate, by way of example, the principles of the present subject matter.

DESCRIPTION OF DRAWINGS

The patent or application file contains at least one drawing executed in color. Copies of this patent or patent application publication with color drawing(s) will be provided by the Office upon request and payment of the necessary fee.

The present subject matter is illustrated by way of example, and not by way of limitation, in the figures of the accompanying drawings and in which:

FIG. 7 shows collaborative joint editing of a meeting transcript in an editing application, according to one or more embodiments of the present subject matter;

FIG. 8C shows an exemplary meeting transcript, according to one or more embodiments of the present subject matter;

FIG. 12 shows an exemplary replacement of the text due to transcription errors, according to one or more embodiments of the present subject matter;

DETAILED DESCRIPTION

The present subject matter pertains to improved approaches to provide a metadata-enriched, speaker-attributed transcript of real-time conversations. It can provide a textual transcript with various metadata that allows a convenient review and archive of the conversations or meetings. Embodiments of the present subject matter are discussed below with reference to FIGS. 1-20.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

The following sections describe systems of process steps and systems of machine components for automated transcription of conversations. These can be implemented with computers that execute software instructions stored on non-transitory computer-readable media. Improved systems for transcribing and editing transcripts can have one or more of the features described below.

Figure 1:
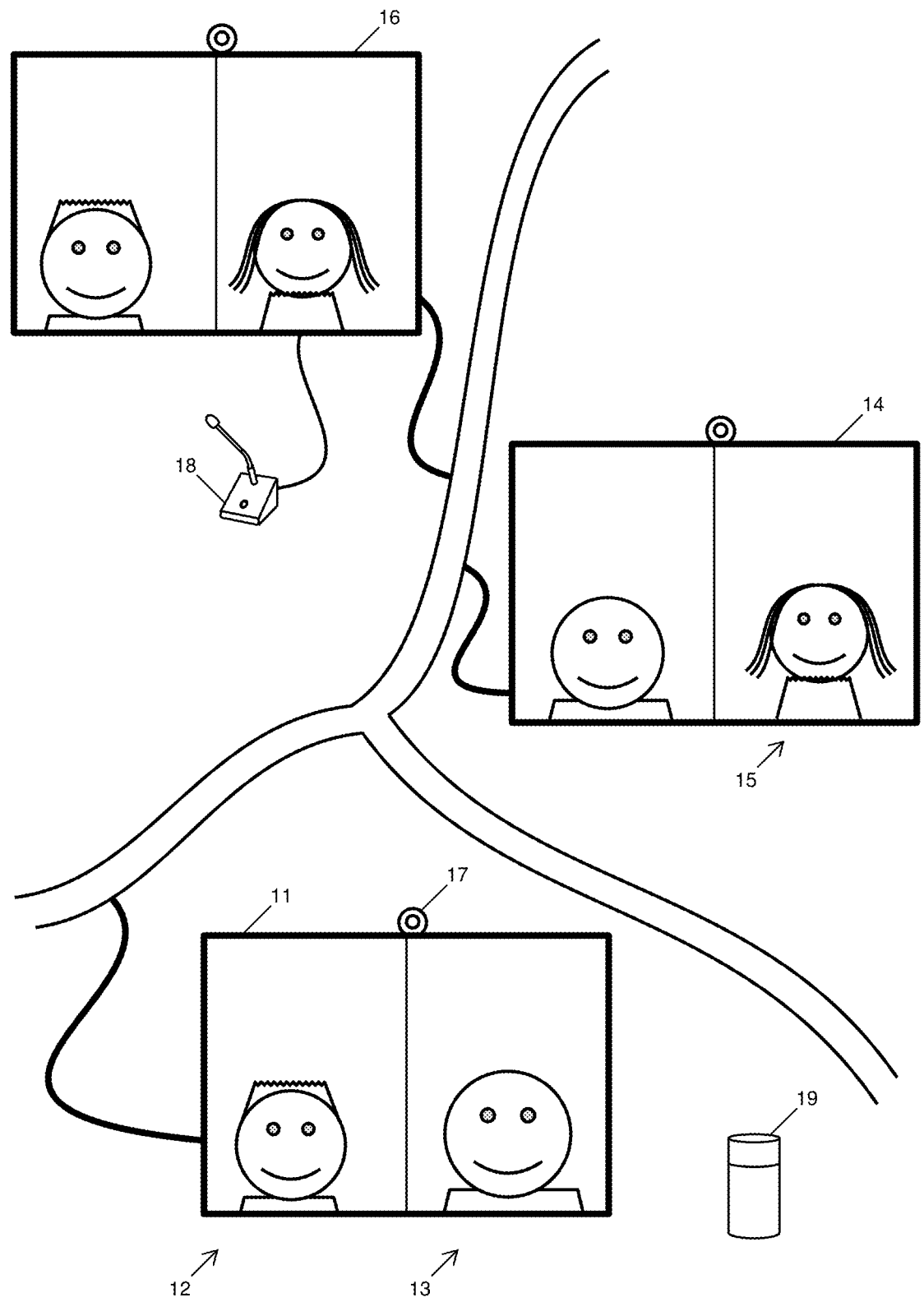
FIG. 1 shows exemplary views of a multi-speaker video conference configured to implement the present subject matter.

FIG. 1 shows an exemplary diagram of a three-way video conference using three separate terminals, each mounted to the back of a display and having a cable connection to an interconnecting network such as the internet. In a first location, Alice 15 can view first display 11. It shows the remote meeting participants Bob 12 and Charlie 13. In a second location, Bob 12 can see second display 14. It shows Charlie 13 and Alice 15. At a third location, Charlie 13 can view third display 16. It shows Bob 12 and Alice 15. Each display can have a camera 17. To capture audio data, all types of audio sources can be adopted. For example, the terminal at the third location can have a microphone 18 connected to the terminal through a cable. The terminal at the second location can use a microphone built into the camera. The terminal at the first location can have a wireless connection to a smart speaker 19 that captures sound and transmits it to the terminal through, e.g., Internet or intranets, wireless cellular networks, local area network (LAN), wide area network (WAN), Wi-Fi, Bluetooth, near-field communication (NFC), 5G connection, or other wireless communication protocols.

According to some embodiments, the terminals can receive audio and video streams and send them to a cloud video conferencing system. Similar technologies are useful for audio conferencing without video. The cloud video conferencing system can receive the audio streams from the terminals or audio sources and treat each as a separate audio channel. For each of the audio channels, the cloud conferencing system can perform Automatic Speech Recognition on speech to transcribe a transcription in real-time. It can further store the transcription on a non-volatile computer-readable medium. According to some embodiment, the system can store the audio or the video data from which the speech was transcribed for playback or archive.

According to some embodiment, the system can also use different types of metadata to indicate the audio/video content and enables an efficient review/edit of the transcript. Metadata can be any supplementary data that describes information about the primary data, e.g., audio and video data, textual transcript data. Examples of such metadata can be speaker diarization, timestamp markers, text format, embedded hyperlinks, playback controls, static or dynamic image repositories, etc.

According to some embodiments, the system can perform the transcribing locally at terminals. According to some embodiments, the system can perform the transcribing on a server in a network or in a hybrid of local and network computing. In one example of a hybrid embodiment, a local terminal performs ASR using low-resource models that include a relatively small vocabulary, which can provide faster initial display. A networked server can perform higher accuracy ASR using larger models, large vocabulary, organization-specific vocabulary, custom phrase replacement, natural language grammar processing, of some combination of such features and techniques. The networked server can send the transcription back to the local device, which then replaces the local transcription.

According to some embodiments, the system can define a standard communication protocol that supports heterogeneous terminals, servers, and related applications and services. This approach can allow different device makers to design and sell devices to meet different application-specific needs. For example, a terminal for homes might connect to a television through a High Definition Multimedia Interface (HDMI) connection. A terminal for an office conference room can connect using a wireless signal to a network-attached video projector. A terminal for a lecture hall can be integrated into an audio soundboard used to set speaker and recording levels. Some terminals can have a built-in screen or speakers or both and can have interfaces to a keyboard or mouse or other Universal Serial Bus (USB) peripheral devices. A notebook computer, tablet, or smartphone with apps installed that use the standard communication protocol can act as a terminal device. Some systems can provide a client-side browser script that supports the standard communication protocol. A browser-based implementation can enable essentially any device that runs a browser to act as a terminal.

Figure 2:
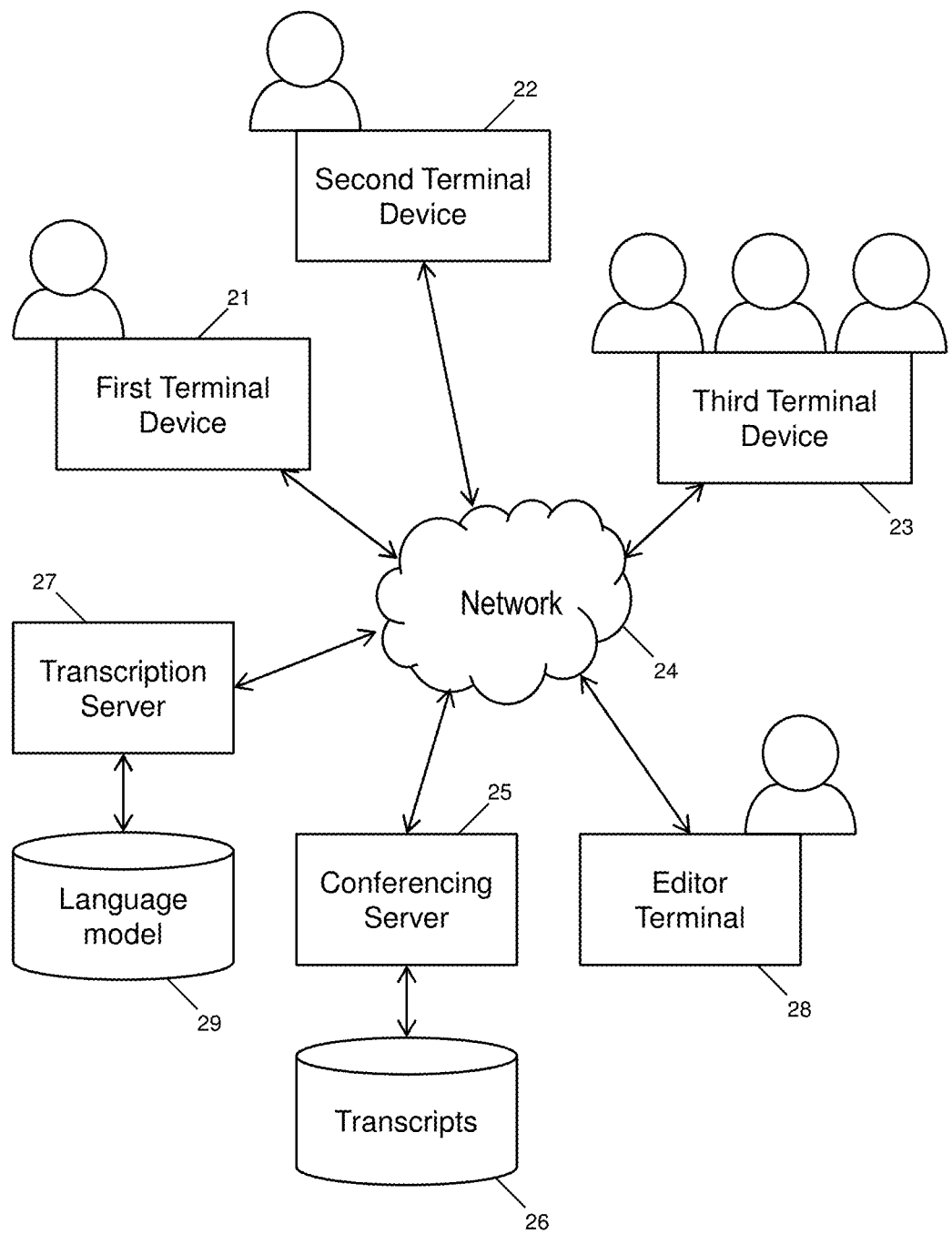
FIG. 2 shows a system that is configured to implement a method and system for automatic conversation transcription, according to one or more embodiments of the present subject matter.

FIG. 2 shows a system that is configured to implement a method and system for automatic conversation transcription with non-exhaustive exemplary terminals and connected components. According to some embodiments, a first terminal device 21 can capture and play audio and/or video, both of which can be transmitted to a conferencing server 25 in the network 24. According to some embodiments, in addition to capturing and transmitting audio/video, a second terminal device 22 can receive, via network 24, a text transcript of speech from other terminals connected to a video conference. Furthermore, the second device 22 can have an editing application or interface that allows its user to edit the text. According to some embodiments, The second device 22 can send transcript edits to network 24 in real-time so that another user on a separate terminal can view the changes simultaneously and jointly edit the transcript.

A third terminal device 23 can work for relatively large spaces with multiple meeting participants. It can have an array of multiple microphones. When detecting speech, the third terminal device 23 can execute an acoustic beamforming algorithm to determine the relative angle of the speaker. It can send a mix of audio from the array microphones and periodic data segments, indicating the angle of received speech. Microphone arrays can help with discriminating between the speech of multiple meeting participants using diarization. It would also be possible for a terminal device to send multiple time-synchronized streams of audio, one from each microphone, to a server so that the server can run an acoustic beamforming algorithm.

According to some embodiments, the first terminal device 21, second terminal device 22, and third terminal device 23 can communicate with a conferencing server 25 via network 24. In some systems, terminals can perform Automatic Speech Recognition locally and send the transcribed text. According to some embodiments, the conferencing server 25 can perform Automatic Speech Recognition to transcribe speech. The conferencing server 25 can store the transcripts 26 on a computer-readable medium.

According to some embodiments, the system can perform transcription on the same server that manages conferencing and transcript storage. According to some embodiments, the system can use different servers for different functions of storage, conference video, audio communication, and transcription. In the system of FIG. 2, a separate transcription server 27 can perform Automatic Speech Recognition and send the transcripts to the conferencing server 25. The system can have terminals send speech audio directly to the transcription server 27, which can transmit the transcripts back to the terminals or conferencing server 25.

According to some embodiments, the Automatic Speech Recognition system can adopt a domain-specific language model 29 to generate the transcripts. The system can enable customization of a language model for a specific company, a specific person, a specific service subscriber, or other selection from a group. A domain-specific language model can allow a system to recognize words that are known and frequently used by certain people even when they are unknown or uncommon among a broader range of speakers. A language model can include custom dictionaries of recognizable words and their pronunciations. It can also model the statistical frequencies of word sequences to significantly improve the accuracy of Automatic Speech Recognition. As such, by adopting one or more domain-specific language models, the present automatic transcription system can improve transcription accuracy.

According to some embodiments, the system of FIG. 2 can comprise an editor terminal 28 that is not a participant in the video conference. The editor terminal 28 can have a keyboard and display to show stored transcripts 26. The editor terminal 28 can execute a browser such as Google Chrome, Mozilla Firefox, or Apple Safari. The browser can run an editing application provided by the conferencing server 25 in a format such as JavaScript or other client-side languages. The editor terminal 28 can access and edit transcripts 26 in real-time as the system creates them through Automatic Speech Recognition during a video conference. The editor terminal 28 can also access and edit stored transcripts after a video conference is concluded.

According to some embodiments, the editor terminal 28 can modify the transcripts and save them at the storage medium via network 24. The editor terminal 28 can, via the editing application, assign various editing permissions to different users. For example, it can restrict the editing capabilities of the editor and such restrictions can control the transcription accuracy.

According to some embodiments, the editor terminal 28 can, via the editing application, enable collaborative editing between multiple editors. While two or more editors can jointly modify the stored transcripts, the system can, at the same time, push transcript changes to all terminals so that they can display the latest version of the transcripts.

According to some embodiments, during joint editing of the transcript, the editing application can identify a user with a unique marker displayed on the transcript. The editing application can further assign various editing permissions to the plurality of users. According to some embodiments, the editing application can continuously update the transcript according to the audio streams in real-time. While two or more editors can jointly modify the stored transcripts, the system can, at the same time, push transcript changes to all terminals so that they can display the latest version of the transcripts.

According to some embodiments, the system can, via the editing application, enable a global replacement of a word or a phrase throughout the transcript. Furthermore, the system can automatically save, or prompt the user to save, a preferred text over the originally transcribed text in a text replacement dictionary. When the system recognizes the originally transcribed text, it can automatically replace it with the preferred text. According to some embodiments, a domain-specific language model can be configured to recognize an audio segment and correctly associate it with the preferred text transcription, which can improve the transcription accuracy for a specific client.

Figure 3:
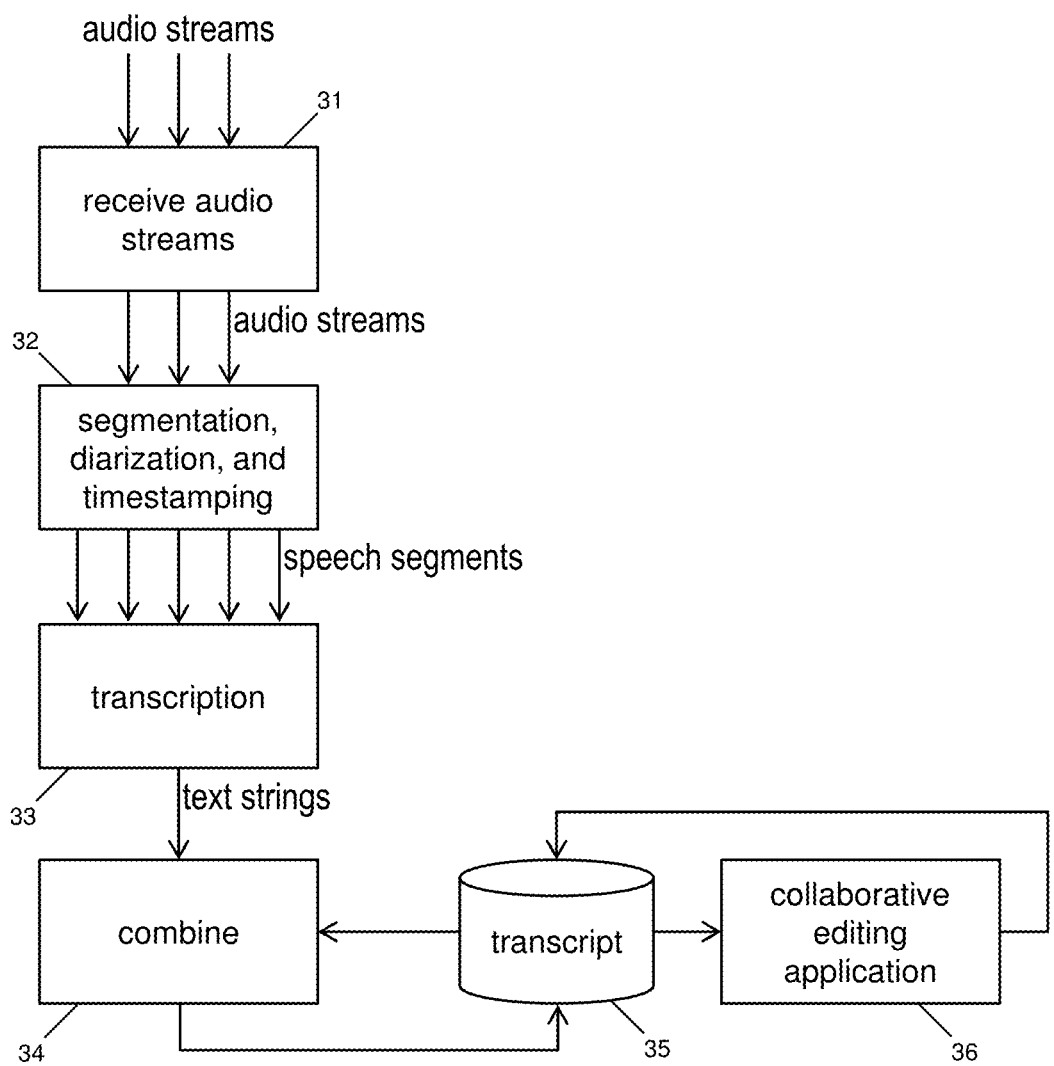
FIG. 3 shows an exemplary process for generating and editing a transcript of a multi-speaker conversation with multiple audio streams, according to one or more embodiments of the present subject matter.

FIG. 3 shows an exemplary process for generating and editing a transcript of a multi-speaker conversation. According to some embodiments, the system can receive one or more audio streams 31 from one or more terminals or audio sources. As such, the server can provide a central point for coordination of conferencing data exchange and control. According to some embodiments, the server can process the audio streams 32 by performing voice activity detection (VAD) on the audio, segmentation of the stream into segments of speech and timestamping of the audio data from the stream or the segments. Different systems can perform those functions in parallel or in series with different orders. The resulting speech segments can be associated with timestamps and some form of indication, e.g., speaker indicators, of who was the speaker of each segment.

According to some embodiments, segmentation can split the audio stream into homogeneous segments, or alternatively, to detect changes in speakers, also known as conversation turns. The system can segment the audio streams based on the detected voice activity data. It can further timestamp each audio segment by marking the beginning, end, and duration of each segment. According to some embodiments, the system can further preprocess the audio data, for example, by filtering out the background noise.

According to some embodiments, the system can proceed to transcribe 33 the speech segments into text strings with one or more speech recognition systems. A speech recognition system can be an Automatic Speech Recognition (ASR) and natural language understanding (NLU) system that is configured to infer at least one semantic meaning of an audio segment based on various statistical acoustic and language models and grammars. According to some embodiments, the speech recognition system can comprise at least one acoustic model. The speech recognition system can further comprise one or more pronunciation models, lexicons, and language models for natural language processing.

An acoustic model can be a statistical model that is based on hidden Markov models and/or neural network models, which are configured to infer the probabilities of phonemes in the audio. Examples of such acoustic models comprise convolutional neural networks (CNN) and recurrent neural networks (RNN) such as long short-term memory (LSTM) neural networks or gated recurrent units (GRU) and deep feed-forward neural networks. Phoneme probabilities are output that can be subject to word tokenization and statistical analysis by language models to create transcripts.

According to some embodiments, the system can encode each text string as a distinct data object with its speaker indication and timestamp(s). Some systems can compile such objects into a database of text string objects. Some systems can aggregate text strings into a single file marked up with tags of the speaker indications and timestamps. In any case, the system can combine 34 the text strings in chronological order to generate a transcript 35, which can be saved on a computer-readable medium. To facilitate editing, the system can, via editing application, save, back up, duplicate, and transfer transcripts as needed.

According to some embodiments, during a meeting in progress, the system can provide the transcript 35 for live viewing by meeting participants in real-time. In addition, the system can provide the transcript 35 to editors live during a meeting or later for editing. According to some embodiments, a collaborative editing application 36 can enable joint editing among multiple editors. For example, multiple editors can simultaneously enter changes, such as additions, deletions, and replacements of text, wherein such changes can be automatically saved in the server and immediately propagated to other editors.

Figure 4:
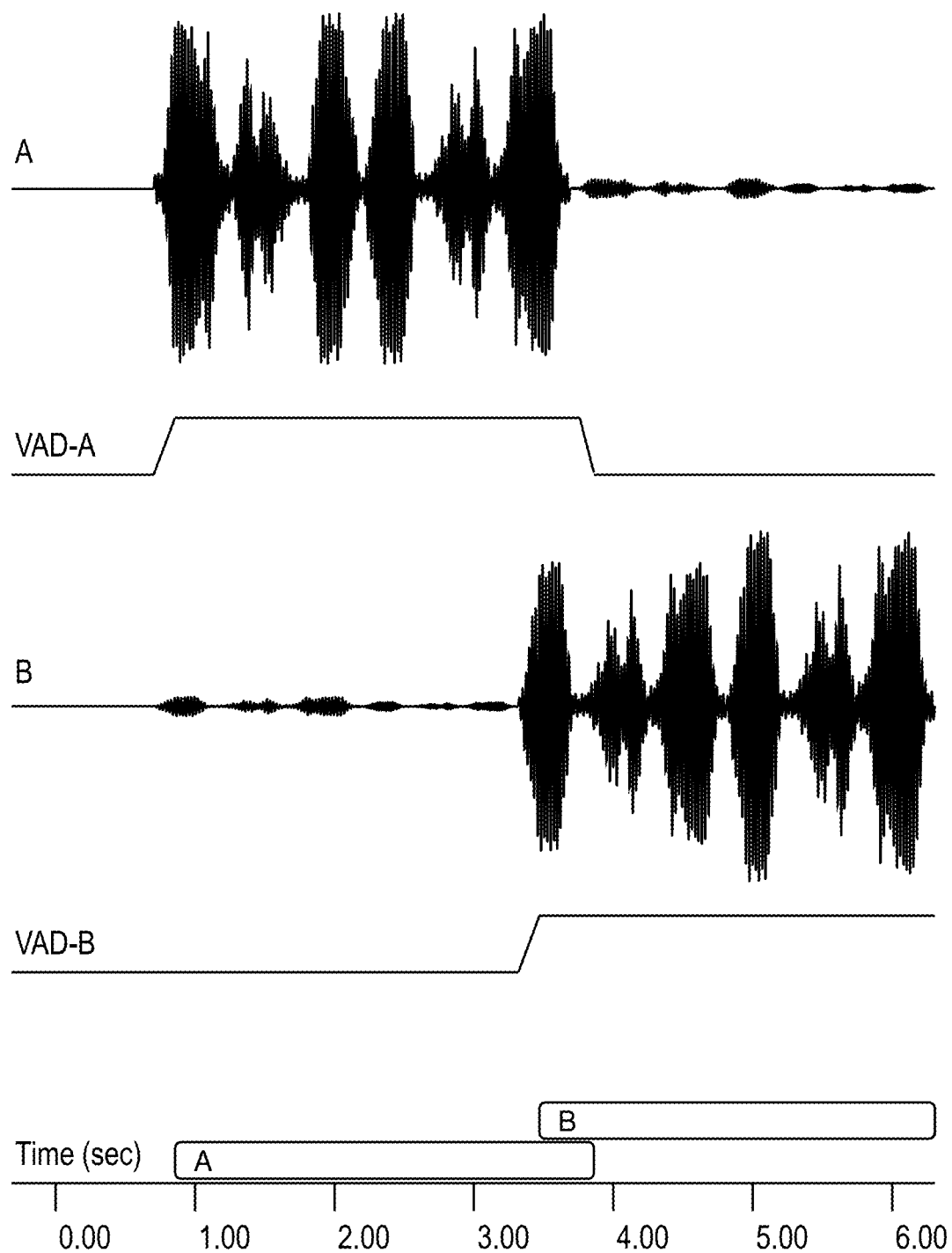
FIG. 4 shows exemplary speech activity with voice activity detecting over time, according to one or more embodiments of the present subject matter.

FIG. 4 shows exemplary speech activity with voice activity detecting over time. According to some embodiments, the system can adopt a multimodal speaker diarization model to determine speaker identities in a multi-speaker meeting. A speaker diarization model can comprise one or more speaker diarization algorithms that are configured to calculate the number of speakers in a conversation or meeting, and determine the identities of each speaker if available. Furthermore, when the identities of the speakers are available, the system can assign user-specific indicators such as speaker names to label their transcribed texts; when the identities of the speakers are not available, the system can assign general indicators, such as "Speaker 1", "Speaker 2" to distinguish their transcribed texts.

The speaker diarization model can utilize one or more diarization factors to determine the speaker identities. Examples of such diarization factors include audio channel data, acoustic beamforming data, speech feature vectors data, speaker visual data, and extrinsic user data. According to some embodiments, different weights can be assigned to each factor based on the totality of the circumstances. For example, when each speaker is associated with an individual audio channel, diarization is automatic and conclusive, without the need to consider other factors. For another example, when there is face image data associated with the audio data, the model can assign more weight to the speaker visual data if a video analysis model recognizes lip motion or other gestures indicating that a particular speaker is speaking.

According to some embodiments, the speaker diarization model can adopt either the bottom-up or the top-down approaches for implementing diarization. The top-down approach can start with a minimum number, e.g., one, of speaker clusters, whereas the bottom-up approach can start with many, e.g., more than an estimated number, of speaker clusters. Both approaches can be generally based on Hidden Markov Models (HMMs), wherein each state can correspond to one speaker and wherein the transition between states can correspond to conversation turns. Other approaches can also be adopted to implement the speaker diarization of the present subject matter.

FIG. 4 is an exemplary time-domain diagram of two channels of speech audio A and B, wherein the time period is about 6 seconds. A system can generate timestamps of beginning, end, or both of speech segments using a voice activity detection (VAD) function that is configured to detect of the presence or absence of human speech with various algorithms.

In a multi-party conference, when each speaker is associated with an individual terminal, audio source, or audio channel, diarization is automatically determined by the audio channel data. As shown in FIG. 4, lines A and B can show the waveforms of the speech audio from speaker A and B. Lines VAD-A and VAD-B can show VAD signals computed from the waveforms. voice activity detection can detect a significant magnitude of energy in an audio signal at frequencies within the range of human voices. In this example, there is a one-second overtalk between the speakers over the two audio channels. However, because the two channels are separate, voice activity detection can be separately executed for each voice and thereby accurately determine ranges of speech audio for individual speakers. As such, an overtalk between different audio channels does not interfere with VAD or diarization. For example, when terminal A is only used by Alice, the system can automatically conclude that no additional diarization analysis is needed because all audio streams received from terminal A are Alice's speech audio.

According to some embodiments, a system can generate timestamps in response to the VAD's activation. These timestamps can set brackets or boundaries for the segments of speech audio on each channel.

According to some embodiments, when there are multiple speakers in one location or audio channel, acoustic beamforming data can be used to enhance speaker diarization. Acoustic beamforming can be effective when the relative positions of the speakers and the microphones are constant. It can also be effective when the speakers are widely distributed, such as sitting around a table, with the microphones in the middle.

With one or more microphones, acoustic beamforming can assign direction vectors to speech segments, detect changes in the direction vectors, use changes in the direction vectors and changes in speaker feature to identify timestamps for switching speakers.

According to some embodiments, as another diarization factor, speaker feature vectors data can be used to implement speaker diarization. The system can utilize, for example, hierarchical clustering probabilistic linear discriminant analysis (PLDA) to diarize speech by multiple speakers within a single audio channel. In spectral clustering, PLDA can determine different clusters of speech feature vectors within the Laplacian matrix based on graph theory by computing a similarity matrix and hierarchical clustering. Accordingly to some embodiments, the system can perform vector calculations with trained neural networks and use the vectors to calculate clusters using algorithms such as k-means clustering or centroid-based clustering.

According to some embodiments, the system can compute a hypothesis of a speaker change as a weighted hypothesis score that has components of a speaker feature and a direction of speech relative to the microphone. An acoustic beamforming algorithm can be used to compute the direction of speech from an array of two or more microphones. Diarization can hypothesize a speaker change when a difference between windows of audio of a weighted product or weighted sum of scores on a log scale exceeds a threshold.

According to some embodiments, the system can have voice fingerprints for all or some meeting participants. If so, the system can perform speaker recognition and attribute text segments in the transcript to those speakers specifically. Otherwise, diarization can distinguish between different meeting participants sharing a microphone by the features of their voices.

As one speaker's speech feature vectors among different segments remain in a similar range, the system can cluster segments with speech feature vectors under one speaker. Typically, speech segments coming from the same person can have features that are similar within a feature distance threshold or cluster boundaries. The threshold or cluster boundaries value can be empirically predetermined or dynamically adapted. According to some embodiments, the system can determine the distance between the speech feature vectors of a group of speech segments is below a threshold and cluster these speech segments under one speaker by assigning the same indicator, e.g., a speaker name.

One tool for diarization is the x-vector-based Kaldi ASR open-source software. It has the benefit of many pre-trained models being available. Kaldi uses a Time Delayed Deep Neural Network (TDNN) acoustic model. It is useful for per-frame voice activity detection VAD. TDNN and stats pooling together can indicate breaks between speech segments. TDNN VAD can classify speech or non-speech per frame and connect them as speech or non-speech segments by Finite State Machine (FSM).

After segmentation, the system can perform speech feature extraction separately on each segment. Speech segments can be clustered based on the location of their speech feature vectors within a vector space.

According to some embodiments, the system can represent speaker features using different types of speech feature vectors such as i-vectors, d-vectors, x-vectors, or other proprietary representations. The system can also compute feature vectors per segment or smaller audio chunks, such as a sliding window of samples computed at a per-frame frequency. One way to compute the segment feature vector is to aggregate feature vectors computed on audio chunks across all chunks within a speech segment.

According to some embodiments, as yet another diarization factor, the system can utilize speaker visual data to diarize speech. When a video meeting is conducted, the video stream captured by the embedded cameras can comprise the speaker's head or body images. For example, the system can analyze the images and identify a speaker by his or her facial features that was previously registered or determined in the system. In particular, the system can analyze the user's facial movement, such as mouth movement, and determine whether it matches with the corresponding audio segments. Analyzing facial movements can be done with a video analysis model, such as a neural network with spatio-temporal convolutional layers, trained to recognize lip motion. This visual analysis can be helpful when there are several speakers sitting close in one room as other diarization factors can have limited uses. According to some embodiments, the speaker visual data can be analyzed in conjunction with the audio data to enhance an identification probability of a speaker.

According to some embodiments, the various diarization factors disclosed herein can be synchronized to identify and label speakers. For example, the speaker visual data can be synchronized with the voice feature vectors to confirm the identity of a speaker. Alternatively, the acoustic beamforming data can be compared with the audio channel data and an assignment of identiy made conditionally upon a correspondence with previous pairings. Pairings are then saved in a history buffer, which might be time limited to accommodate the fact that speakers may move within the camera view over time.

Figure 5:
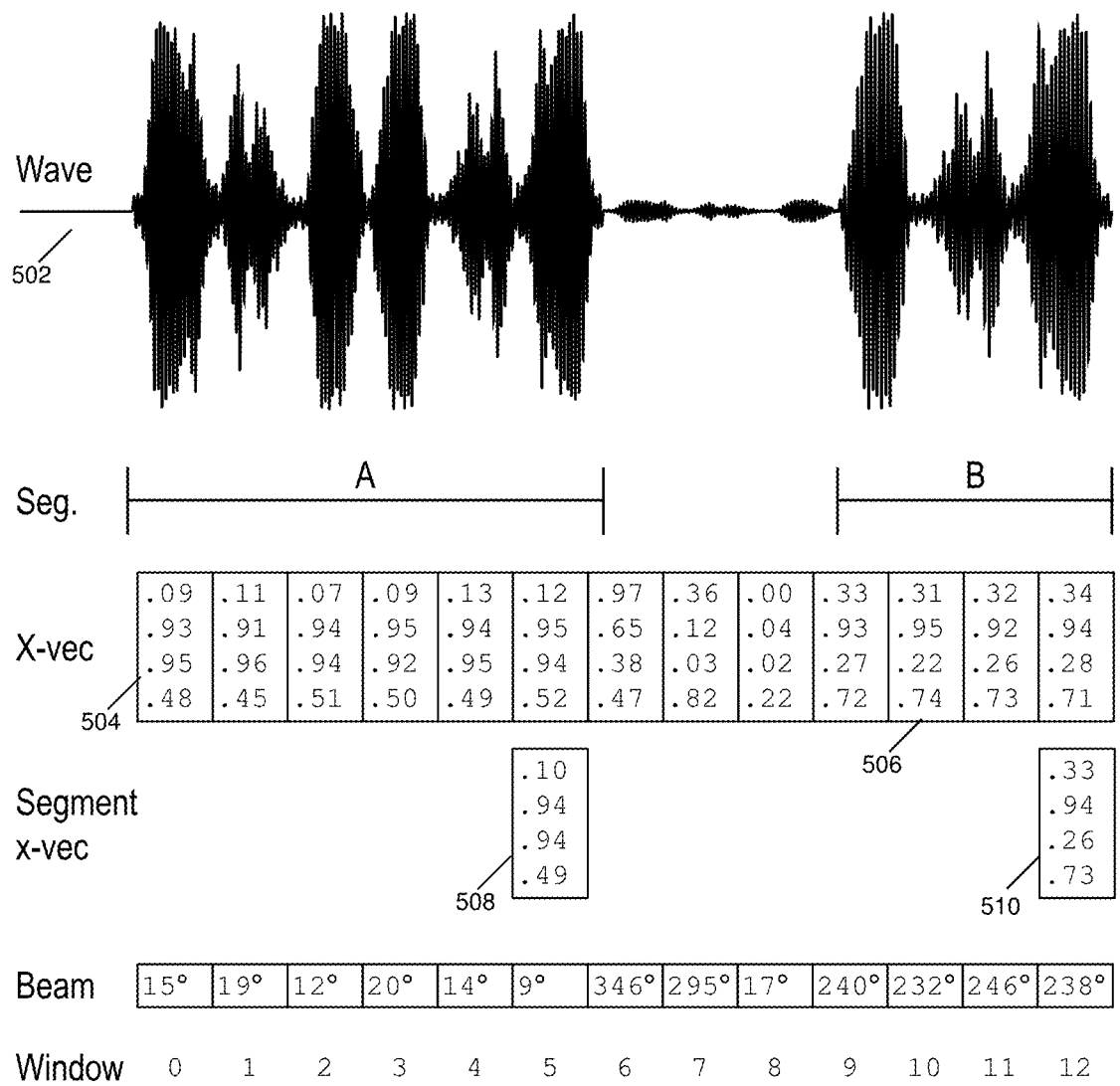
FIG. 5 shows exemplary speech activity with segmentation, x-vector computation, and beamforming detected angles over a sequence of frame windows, according to one or more embodiments of the present subject matter.

FIG. 5 shows exemplary speech activity with segmentation, x-vector computation, and beamforming detected angles over a sequence of frame windows. As shown in FIG. 5, diagram 502 shows an exemplary time-domain diagram of a single-channel speech waveform. It contains two segments of speech, segment A and segment B. A VAD function can identify likely beginning and endpoint timestamps of the speech segments. A VAD hypothesis can be a function of one or more audio volumes, the stability of the acoustic beamforming angle between frames, and other indicators. The system can compute an x-vector for each segment of audio. In FIG. 5, the first group of x-vectors 504 can represent segment A; and the second group of x-vectors 506 can represent segment B. At the end of each speech segment, the system can calculate an aggregated x-vector for the completed speech segment. In FIG. 5, the first group of aggregated x-vectors 508 can represent segment A; and the second group of aggregated x-vectors 510 can represent segment B. As shown in FIG. 5, as the aggregated x-vectors vary significantly between the two segments, the system can infer that segment A and segment B belong to different speakers. As such, as one speaker's aggregated x-vectors among different segments remain in a similar range, the system can cluster segments with similar x-vectors under one speaker.

According to some embodiments, the system can also perform segmentation and diarization using a Region Proposal Network (RPN), which can combine the segmentation, embedding extraction, and boundary refinement into one stage. In addition, RPN can handle overlapped speech.

According to some embodiments, RPN can adopt a Faster R-CNN, which was originally developed for object detection within image processing. For image processing, RPN can slide a convolutional filter over the image and output a set of object probabilities. For diarization, RPN can consider every audio frame as a possible target filter center and expand from it backward in time or backward and forward in time with a delay of several audio frames.

When the number of speakers from one audio channel, e.g., a single microphone (or microphone array), is known, a system can cluster speaker feature vectors using a target number of clusters. Clustering can also be implemented if an approximate number of speakers is known, wherein the clustering can target a small range of more or fewer speakers from the approximate number.

According to some embodiments, the system can use extrinsic user data to infer an approximate number of speakers. Extrinsic user data can be any useable data out of the meeting audio/video files. For example, it can estimate the number of meeting attendees in a meeting calendar or invitation. Other extrinsic data, such as prior emails related to the meeting, can also be used by the system to predict the number and identities of meeting participants.

When the number of speakers is unknown, clustering can use a threshold value based on the distance between feature vector locations within a vector space as a difference between speakers, e.g., feature vectors within a threshold distance can be clustered as one speaker. The threshold value can be empirically predetermined or dynamically adapted. According to some embodiments, the system can automatically determine a hypothesized number of speakers, and cluster segments based on the hypothesized number and further adjust the number as calculation progresses, e.g., in spectral clustering.

According to some embodiments, the speaker diarization model can be a pre-trained embedding model. For example, it can be pre-trained with an individual model per human language, region, or accent. The embedding models can also be customized classifier models on a per-customer basis where customers are companies or other organizations of multiple people who pay for a video conference captioning service. Similarly, it is possible to use a per-customer adaptation layer with a general pre-trained model for adaptation to a customer's particular type of meeting attendees, room acoustics, or audio equipment distortion profile.

Figure 6A:
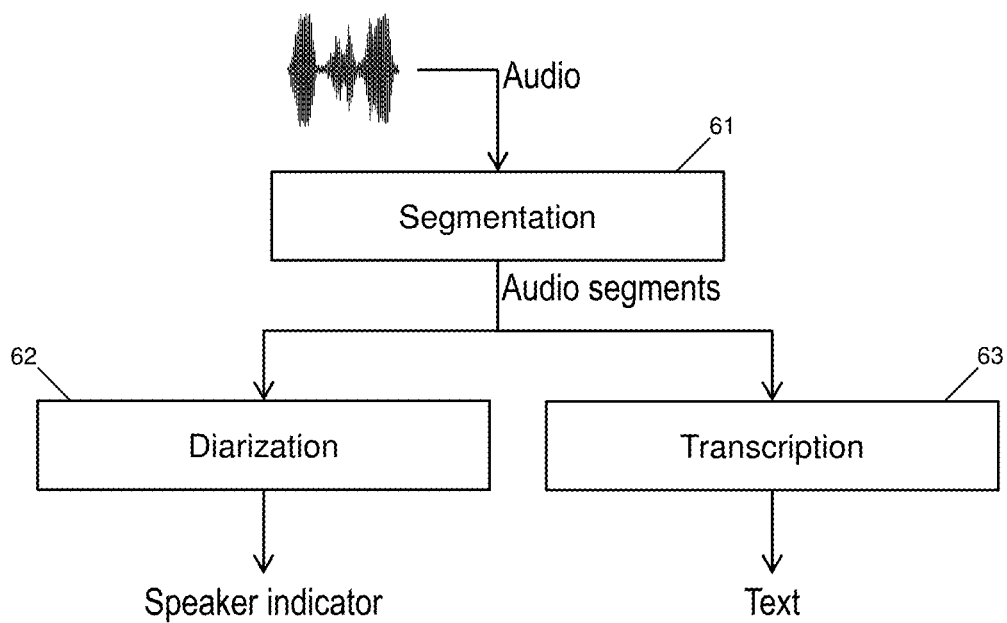
FIG. 6A shows a first exemplary process of diarization and transcription, according to one or more embodiments of the present subject matter.

FIG. 6A shows a first exemplary process of diarization and transcription. At step 61, the system can receive audio from an audio channel and perform segmentation based on VAD. At step 62, the system can, based on the speaker diarization model, execute speaker diarization for each segment to determine a speaker identity. At the same time, at step 63 parallel to step 62, the system can transcribe each audio segment to generate corresponding text strings.

Next, the system can assign respective indicators to the text strings based on the speaker identities. The text strings associated with one speaker can be assigned to the same indicator. Examples of indicators can be different speaker names, avatar images that represent speakers, orcolors that distinguish speakers from each other. Next, the system can generate a transcript by combining the text strings tagged with speaker indicators.

Figure 6B:
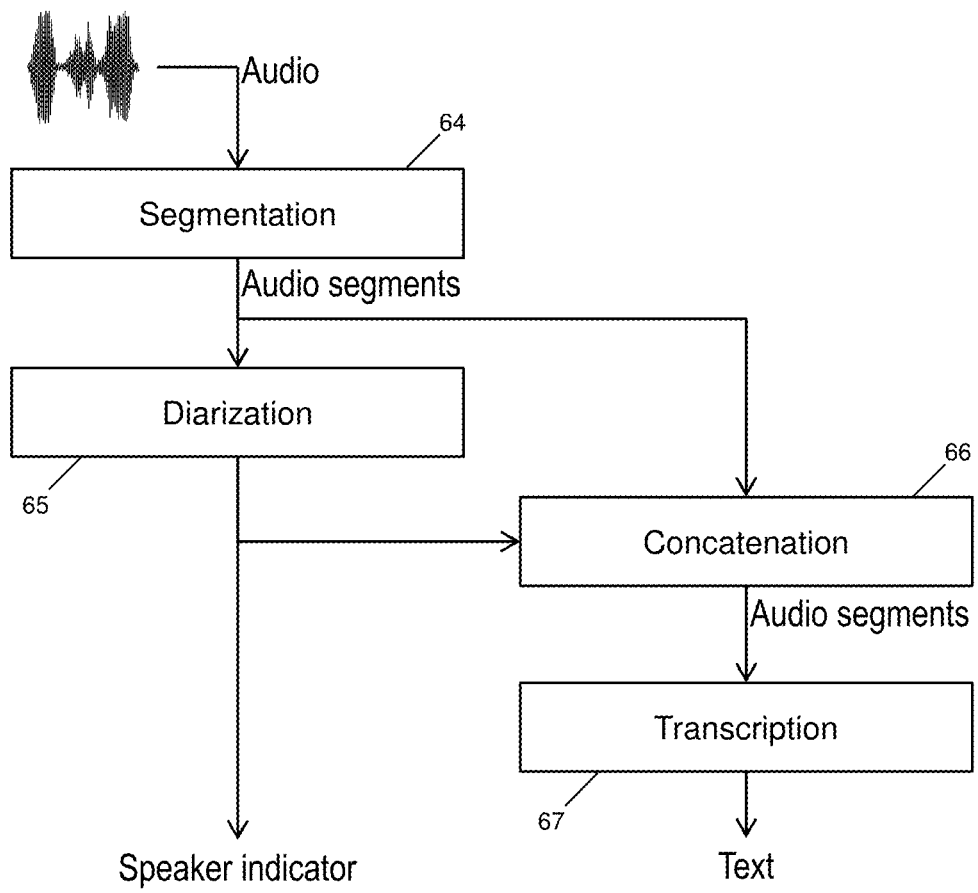
FIG. 6B shows a second exemplary process of diarization and transcription, according to one or more embodiments of the present subject matter.

FIG. 6B shows a second exemplary process of diarization and transcription with concatenation. Concatenation can generate a longer speech segment by linking short samples of recorded sounds of a same speaker. For a single speaker, ASR is often more accurate on longer speech segments. This is particularly true because phoneme discrimination can be more accurate in acoustic models with a model having long-term feature memory such as neural Long Short-Term Memory (LSTM). Accordingly, performing concatenation of speech segments from the same voice can improve ASR accuracy.

At step 64, the system can receive audio from a channel and perform segmentation based on VAD. At step 65, the system can, based on the speaker diarization model, execute speaker diarization for each segment to determine a speaker identity. At step 66, to generate a longer audio segment, the system can concatenate one or more audio segments of the same speaker or likely the same speaker. For example, the longer audio segment can be based on a speaker's original broken speech caused by poor network connection. At step 67, the system can transcribe each audio segment, including the concatenated ones, to generate corresponding text strings.

Next, the system can assign respective indicators to the text strings based on the speaker identities. The text strings associated with one speaker can be assigned to the same indicator. Examples of indicators can be different speaker names, avatar images that represent speakers, orcolors that distinguish speakers from each other. At last, the system can generate a transcript by combining the text strings tagged with speaker indicators.

According to some embodiments, the system can cluster speech segments with the same indicator across multiple conversation turns and then perform transcription for each meeting participant separately. With this approach, it would be appropriate to capture timestamps of conversation turn changes, split the text at those times, and order the text appropriately in the transcript to show the text corresponding to different speaker audio segments in the correct order. These steps can be performed incrementally in real-time during a meeting or as a post-processing step to improve transcription accuracy after a meeting has finished.

According to some embodiments, the system can train an acoustic model to use a feature vector from one or more prior segments to condition the current phoneme discrimination. Such an acoustic model can replace or be used in addition to the concatenation of segments as described herein.

According to some embodiments, the system can adopt a text-independent method to segment audio. Either energy-based methods, Neural Network classification of speech and non-speech, or equivalent methods can be appropriate for different applications. Some ASR models can use text-dependent information such as linguistic statistics, part of speech tagging and language rules, or grammars to assist in segmenting sentences.

Furthermore, according to some embodiments, the system can use both text-independent and text-dependent information to segment audio for speaker diarization. For example, once a hypothesis confidence score of a text-independent segmentation drops below a threshold, a system can run ASR on the speech audio shortly before, shortly after, or both before and after the hypothesized timestamp of a speaker change. The system can also use the time-aligned text generated with a parallel continuous ASR process.

FIG. 7 shows collaborative joint editing of a meeting transcript in an editing application. According to some embodiments, various metadata can be captured and incorporated to enrich the display and functionality of the transcript. One type of metadata can be the optimized formatting data of the transcript. Examples of such metadata include the font style, font size, weight, italicization, underscoring, capitalization, punctuation, line breaks, line spacing, indentation, justification, text color, and background color, and dynamic variations of such aspects over time. For example, varying some aspects of the text can help make it more clear to readers.

The display 70 can separate conversation turns into horizontal segments, each with a color unique to the speaker, e.g., blue for Bill and green for Porter. As such, a specific user color can be an indicator to mark a speaker.

Furthermore, the transcript texts are in black, and the background colors are pastels, which enables the optimized readability of a dark-colored text. This contrast renders the conversation turns obvious. The system can further identify speakers through voice identification or user profile. As shown in FIG. 7, the display 70 can show a speaker name at the beginning of the transcribed text of the speaker. As such, the speaker name can be an indicator to mark a speaker. According to some embodiments, other indicators, such as avatars and user IDs, can also be adopted.

According to some embodiments, the display 70 can describe the recognizable sound that is not speech. For example, a speaker's laughter can be summarily represented by [LAUGHTER]. Furthermore, the system can identify non-speech sound using various sound recognition algorithms, such as neural discriminator models trained on audio recordings of different types of sound. Other examples of recognizable sounds could include dog barks, crying babies, breaking glass, and emergency sirens.

According to some embodiments, as another type of metadata, the system can analyze semantic information and create embedded hyperlinks to look up related information in the transcript. The system can identify words or key phrases within a text string and present the word/key phrase as a hyperlink anchor corresponding to a URL, which can provide additional information of the word or key phrase. Words and key phrases for the system to identify can be stored in general lists or customer-specific lists. Such metadata can further enhance the user interface of the transcript.

For example, the system can identify words that match the names of Wikipedia articles or companies listed on a stock market. For another example, the system can identify text segments that match the names of company employees. As shown in FIG. 7, at location 71 in the transcript, the system has identified the name of an employee, Peter Gibbons, and displayed the transcript text for the name in a different font color with underscoring. A viewer or editor of the transcript in an appropriately enabled application can click or tap the text to invoke a browser that accesses web information on Peter Gibbons' employee profile. In some editors, hovering a pointer over a hyperlink pops up a mini window with information, and moving the pointer away from the hyperlink causes the mini window to disappear.

According to some embodiments, the identified word or key phrase as the embedded hyperlink anchor can further comprise an argument in the URL when text adjacent to the key phrase matches a pattern corresponding to an argument. Various types of arguments can be supported, such as numbers, an enumerated value such as a month name, or reference to database entries such as employee names. According to some embodiments, the system can recognize terms related to relevant data, such as weather or stock prices, and automatically generate hyperlinks to retrieve such data. For example, the text "what's the weather right now in" followed by a word that matches the name of a city in a list of known cities would cause the name of the city to be tagged with a hyperlink that references an API URL to look up the weather and a query argument that is the name of the city. For dynamic information such as weather, some embodiments can capture the data by accessing the URL, store it, and provide it with the stored transcript to provide an accurate record as of when the meeting was recorded. In some embodiments, key phrases can be specified as natural language grammars with slots in the location of relevant variables.

According to some embodiments, the system can identify an n-gram text as having a low frequency within a language model and present the n-gram text as a hyperlink anchor corresponding to a URL associated with a definition of it. An n-gram text can be a word that is rarely used by a general public or less likely to be understood by the anticipated viewer of the transcript.

According to some embodiments, the editing application can enable collaborative editing. As shown in FIG. 7, the editing application can identify users of the editing application with unique markers displayed on the transcript. For example, Alice can have an editing cursor at location 72, and Bob can have an editing cursor at location 73 within the transcript. Each cursor can be labeled with the editor's name and has a unique color. The colors can be more intense than the pastel backgrounds, making the cursors obvious at a glance. Alice and Bob can individually and jointly edit the text by adding, deleting, or replacing texts. Each time one editor makes an edit, the system can automatically update the transcript for both editors. If either editor deletes text surrounding the location of the other's cursor, the system can place the cursor at the location of the deleted text. If either editor adds text at the location of the other's cursor, the system can place the cursors at the end of the added text. A text replacement has the effect of a delete followed by the addition of new text.

According to some embodiments, the editing application is configured to assign various editing permissions to multiple users. For example, the system can have access control to grant each editor or group of editors permission to read, edit, delete, comment, control others' access, or other types of file management operations.

For joint editing of the transcript, a cloud server system can locate transcript data on a server that is physically close to the viewer within the network topology, for example, the internet. For multiple viewers, it is possible to create duplicate copies of the transcript at different network nodes. To provide joint editing, a single cloud server can control the transcript to ensure atomic updates without having to resolve edit conflicts.

In the example transcript of display 70, at location 72, the speaker, Porter, paused between his first sentence, "I'll handle this" and second sentence, "We feel that the problem isn't with Peter." The system's diarization function segmented the speech into two segments. Since it identified both segments as having the same speaker, the display displays both segments in the same dialog turn color, but with a line break between the sentences.

According to some embodiments, the editing application is configured to continuously update the transcript according to the audio streams in real-time. For example, a system can combine transcribed text, with or without respective indicators, to a transcript continuously as a meeting progresses. A document editing application can read the transcript and continuously update the display as new text is combined. Furthermore, some editing applications can provide a search capability to search for text within the transcript.

Document editing can be in a locally installed application on a personal computer, laptop, or mobile device such as a tablet or smartphone. Alternatively, the system can provide the editing application capability in a language such as Javascript that can run within a browser or in an environment such as node.js.

Similar functionality for continuously updated transcripts, collaborative and joint editing, or both can be made available to different consumers. For example, there could be an educational or student version, a consumer version, and a professional business version of a meeting transcription system.

In an educational use case, a system can automatically transcribe a professor's lectures, allow the professor or a teaching assistant to edit the transcript, and allow enrolled students to view the transcript either live or as a saved record. The system can prevent all others from accessing the transcript. In a business use case, a system can create transcripts owned by a company, not by individuals. The company's system administrators can control access for employees. The system can store transcripts in a company repository either in a proprietary data storage device or in a hosted cloud storage service. A system administrator can terminate employees' access if, for example, they leave the company. In a personal use case, the system can store transcripts with private access only for the system subscriber and their invited friends.

According to some embodiments, the system can provide a file export option. When an editor exports a transcript, it can be downloaded to the editor's local computer or provided access in a personal cloud storage environment. Standard formats such as plain text, Hypertext Markum Language (HTML), DOCX, Portable Document Format (PDF), or others can be desirable to different editors or in different use cases.

According to some embodiments, transcripts can contain embedded metadata such as a speaker indicator or a unique indicator of an unknown speaker in a conversation from diarization. Transcripts can also contain metadata such as tags with timestamps of the beginning of speech segments and possibly the ending of speech segments. Other types of metadata are also possible. Some examples of file formats for transcripts are HTML, DOCX, or Extensible Markup Language (XML), or Javascript Object Notation (JSON) application-specific schema-structured files.

A system can also save audio files recorded during the meeting by storing them on a computer-readable medium such as a hard drive, non-volatile memory, or cloud storage environment. Lossless audio files such as WAV format can be appropriate and preserve the best fidelity. Compressed audio files such as MP3 can be useful because they can preserve relatively more information in audible frequency ranges but discard other audio information to reduce the storage and transmission bandwidth requirements. Other audio formats such as Free Lossless Audio Compression (FLAC) can provide benefits of compression, lossless audio reproduction, and a royalty-free technology. If speech audio comes from multiple audio channels or microphones, the system can save it as separate audio files or a multi-channel audio file. In either case, the system can time-stamp audio according to a shared reference clock that all audio channels use and that is the source of timestamps of the transcribed text segments.

A conversation turn can include one or more segments of speech by the same speaker. According to some embodiments, the system can, via an editing application, enable playback of a selected speech turn, e.g., by playing corresponding timestamped segments. According to some embodiments, the system can embed hyperlinks within the text strings, wherein such hyperlinks are associated with the corresponding segments. After receiving a selection of a specific hyperlink by an editor, the system can enable playback of relevant audio streams.

According to some embodiments, the system can provide a configuration option to allow an editor to selectively play or listen to a selected speaker's audio. As an alternative, the system can allow the editor to play or listen to a mixture of all speakers' audio. A mixture can include overtalk, which can provide more context for editing in some cases. A single audio channel can discard overtalk if it comes from different terminals, making the speech easier to understand. For example, the system can provide a hyperlinked button at the point in which the conversation turn changes. An editing application GUI can show such buttons aligned on the left side of a display for left-to-right written languages or the right side of the display for right-to-left written languages. With a conversation-turn-associated playback option, the system can provide a convenient alignment of the texts strings and relevant audio segments for easier and quicker editing of the transcript.

Figure 8A:
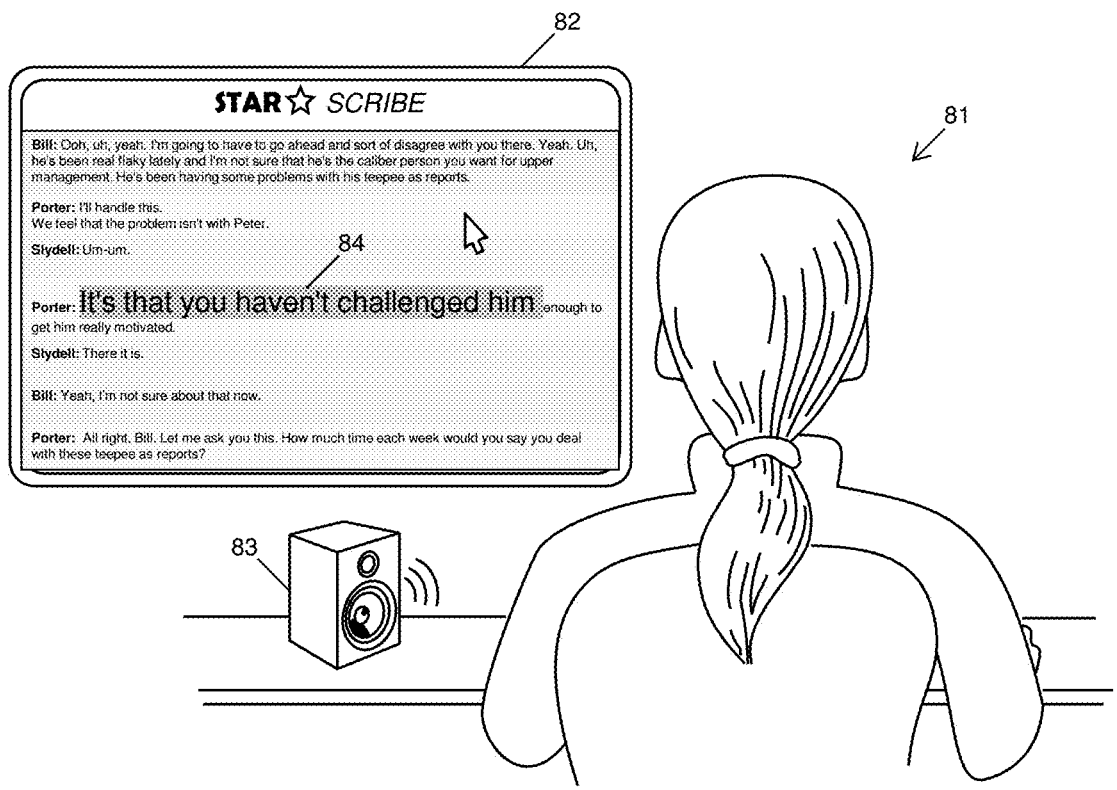
FIG. 8A shows an editing application performing editing with audio playback, according to one or more embodiments of the present subject matter.

FIG. 8A shows an editing application performing editing with audio playback. According to some embodiments, an editor 81 can use an editing application to review and correct a meeting transcript. The editor 81 can have a view of a display 82 showing a transcript editing application. The editing application can run, for example, as an application within the operating system of a personal computer or within a browser. The editing application can make requests to a cloud server that stores transcripts and, optionally, audio. When the editing application is operating using a cloud server that stores audio, it can make requests to play audio corresponding to a text string. The server can receive requests to play audio and then play the audio beginning at the timestamp corresponding to the requested text string. Playing the audio can implemented be by transmitting to audio to the editing application or otherwise providing it to a user of the application.

According to some embodiments, the display 82 can have a graphical user interface (GUI) with a pointer controlled by a hand-operated input device such as a mouse. The GUI can show conversation turns, each with a distinct color. The GUI can provide a pointer icon such as an arrow. The editor can use the hand-operated input device to move the pointer over a conversation turn and perform an activation such as by clicking a mouse button. As a result, the editing application can output the audio from the channel that contains the speech of that speaker's turn. The audio can begin playing from the nearest timestamp preceding the timestamp associated with the beginning of the conversation turn on which the editor activated the pointer. The audio output is through a speaker 83.

According to some embodiments, as the audio is being replayed, the system can dynamically highlight the corresponding text strings 84 by altering their appearance. As shown in FIG. 8A, the corresponding words can be shown in enlarged and bold font as the relevant words are simultaneously spoken in the audio.

According to some embodiments, the system can automatically scroll the transcript text in coordination with audio being replayed. For example, by determining the relevant audio segments being replayed, the system can highlight the text strings corresponding to the segments. As an alternative, the system can show the text strings in a ticker style. According to some embodiments, the system can anticipate and highlight the upcoming text strings, for example, display them only when they are spoken.

According to some embodiments, the automatic scrolling feature is configurable, meaning it can be switched on/off, or personalized to meet the editor's preference. For example, the highlighted text can be based on a line-by-line basis or a word-by-word basis to help the editor to visually track the relevant text. According to some embodiments, the automatic scrolling feature can be similar to the highly acclaimed LiveLyrics feature of the SoundHound music recognition app available in the Apple app store for iPhones and iPads and the Google Play store for Android devices, which displays lyrics in synchronization with ambient playing music.

According to some embodiments, while replaying the relevant audio segments, the system can also play the corresponding video data on the display 82. This would enable the editor to visually check and confirm the content of the transcript while listening to the audio.

Figure 8B:
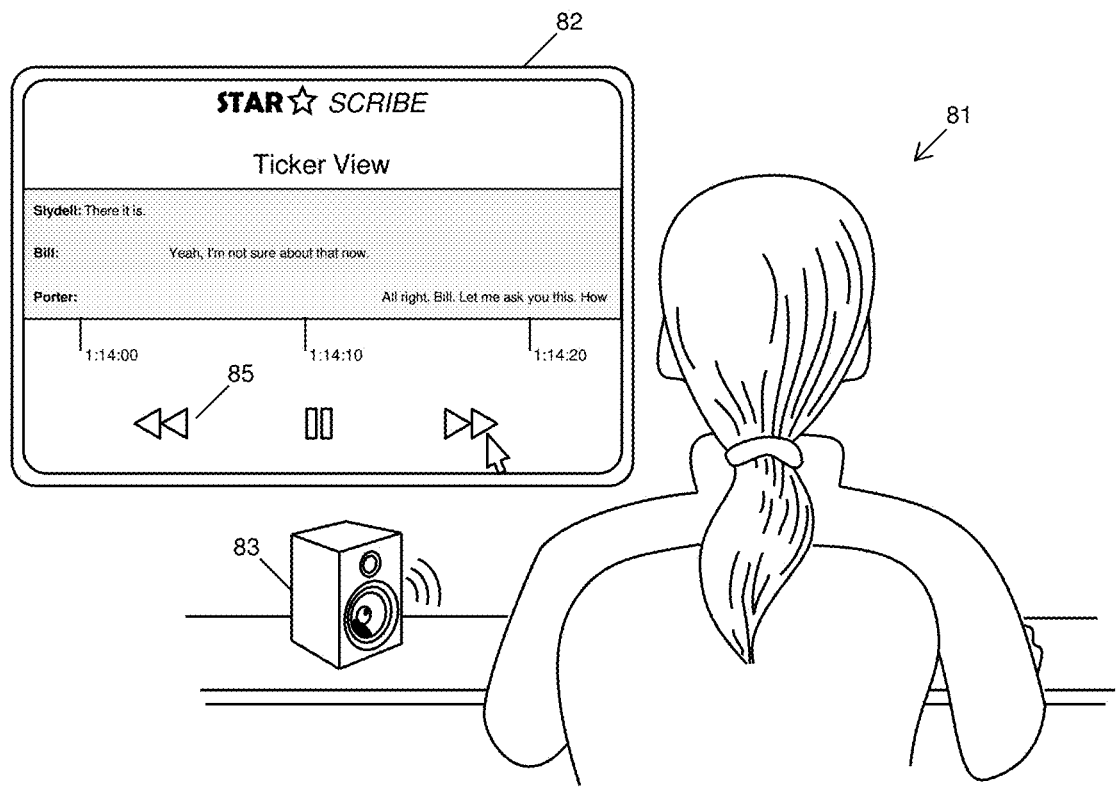
FIG. 8B shows an editing application performing editing in a ticker view, according to one or more embodiments of the present subject matter.

FIG. 8B shows an editing application performing editing in a ticker view. As shown in FIG. 8B, the GUI of the display 82 can show the text strings horizontally according to the recorded timestamps associated with them. In this view, the horizontal spacing between two text strings can indicate the amount of time between the two audio segments. For example, a long pause between two sentences can be shown as a gap between the transcribed texts. On the other hand, the overlapping sentences can be shown as overlapping text strings between two speakers.

According to some embodiments, when the audio is being replayed, the speaker names, e.g., Slydell, Bill, can remain static, whereas the spoken words in the text can be dynamically highlighted from left to right, according to the timing of the playback.

According to some embodiments, a plurality of control options 85 can be adopted to enable convenient control of the playback audio. In particular, the control options 85 can dynamically change according to the playback status. For example, when the audio is not being replayed, the pause icon can turn into a play icon. On the other hand, the play icon can turn into a pause icon when the audio is being played.

According to some embodiments, a control option can accelerate or slow down the speed of the playback. For example, the playback speed can be set as 1.5× of normal speed to enable a quicker replay for transcription checking. For another example, the playback speed can be set as 0.5× of normal speed so that the editor can hear it clearly. In response to the changed playback speed, the displaying speed of relevant text strings can be adjusted on display 82.

FIG. 8C shows an exemplary meeting transcript that contains overtalk. According to some embodiments, the vertical spacing between two text strings can indicate the amount of time between the two audio segments. For example, a long pause between two sentences can be shown as a large vertical spacing or gap between the transcribed texts. On the other hand, the overlapping sentences between two speakers can be shown as two text strings without any spacing, as shown in lines 6 and 7. According to some embodiments, as shown in FIG. 8C, the system can match the text of the later speaker to align with the text of the earlier speaker according to their recorded timestamps.

Figure 9:
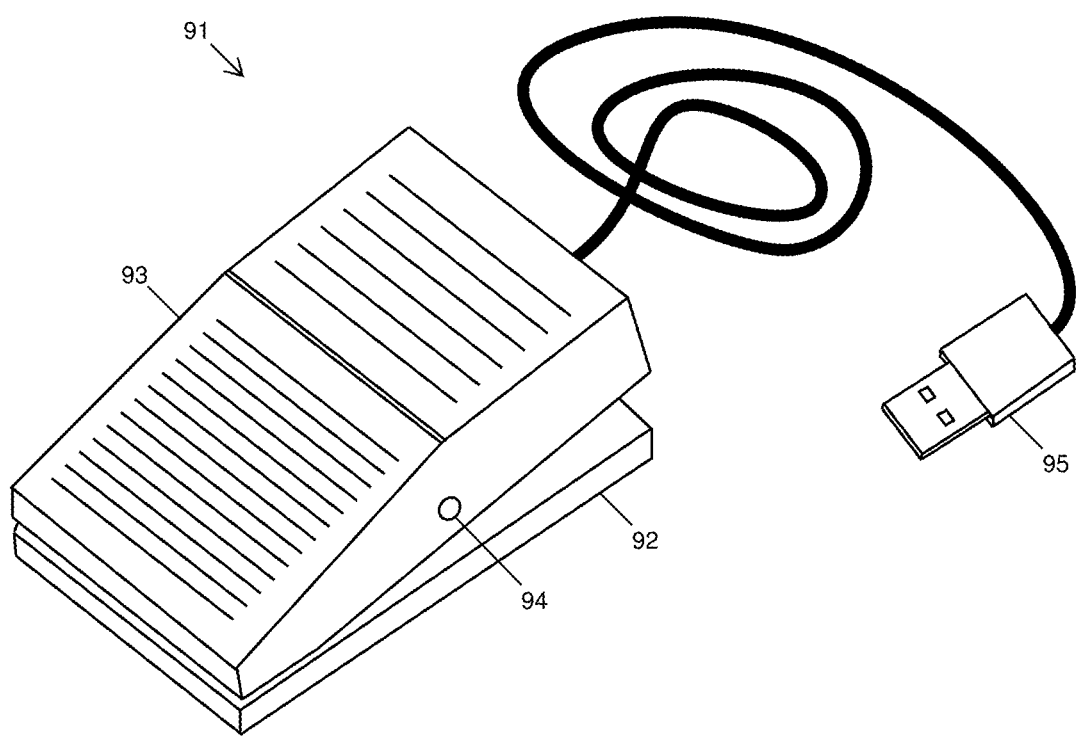
FIG. 9 shows a foot pedal for exemplary audio playback control, according to one or more embodiments of the present subject matter.

FIG. 9 shows an example of a foot pedal 91 that can control audio playback while editing a transcript. Even though typing on a keyboard is an efficient way to make text edits, it can be limiting as the editor needs to continually switch from a keyboard to a pointing device such as a mouse or touchpad, which can make editing inefficient and increase the risk of repetitive stress injuries such as carpal tunnel syndrome. Accordingly, some editing terminals can support input from a device such as a foot pedal so that an editor can efficiently make edits by keyboard while simultaneously controlling the audio playback. According to some embodiments, the editing application can enable an editor to use a foot pedal or voice commands or another type of hands-free interface to select conversation turns and invoke playback of the corresponding audio.

As shown in FIG. 9, the foot pedal 91 can have a heavily weighted base 92 with a non-slip surface using a material such as rubber or silicone on the bottom side. A foot contact plate 93 can allow a user to activate the foot pedal. The foot contact plate 93 can pivot on a hinge 94. Between the foot contact plate 93 and base 92 is at least one sensor (not visible) that can detect pressure from the foot on the foot contact plate 93. Some foot pedals can have two or more sensors, at least one being closer to the heel and one being closer to the toe end of the foot contact plate 93. This arrangement can enable multiple control motions by the user. Some foot pedals can have sensors that can detect not just a push, but a pressure level. Some terminals can use a pressure level indication to adjust the speed of audio playing.

In any case, a foot pedal can detect a tap of the toe or heel, as appropriate for its sensor configuration. Some foot pedals can enable double taps, long taps, or even triple taps for a user to indicate different desired functions. The functions that can be invoked by each kind of tapping is programmable. One example of an interface between a foot pedal and an editing terminal can be a Universal Serial Bus (USB) protocol connection through a cable between the foot pedal and a USB connector 95.

For a browser-implemented editing application, such as one implemented using JavaScript, a specialized application programming interface (API) such as the WebUSB API from Google can provide the needed support of a specialized USB device such as a foot pedal. Native editing applications can use system-level drivers for USB devices or devices with computer interfaces other than USB. The functionality similar to USB is possible through a Bluetooth protocol wireless connection between an appropriately designed foot pedal device and editing terminal master.

According to some embodiments, an editing application can adopt voice commands to enable a hands-free input interface. An editing terminal with a microphone or microphone interface such as through a tip ring ring shield (TRRS) mini connector or USB connection can receive voice commands from an editor.

According to some embodiments, an editing terminal can process the voice commands with local speech recognition or a phrase spotter to recognize commands. According to some embodiments, a terminal can communicate to a speech recognition or natural language processing server through an web API. For example, the terminal can transmit the voice audio to the server, which can respond with application-specific packages of command information.

Figure 10:
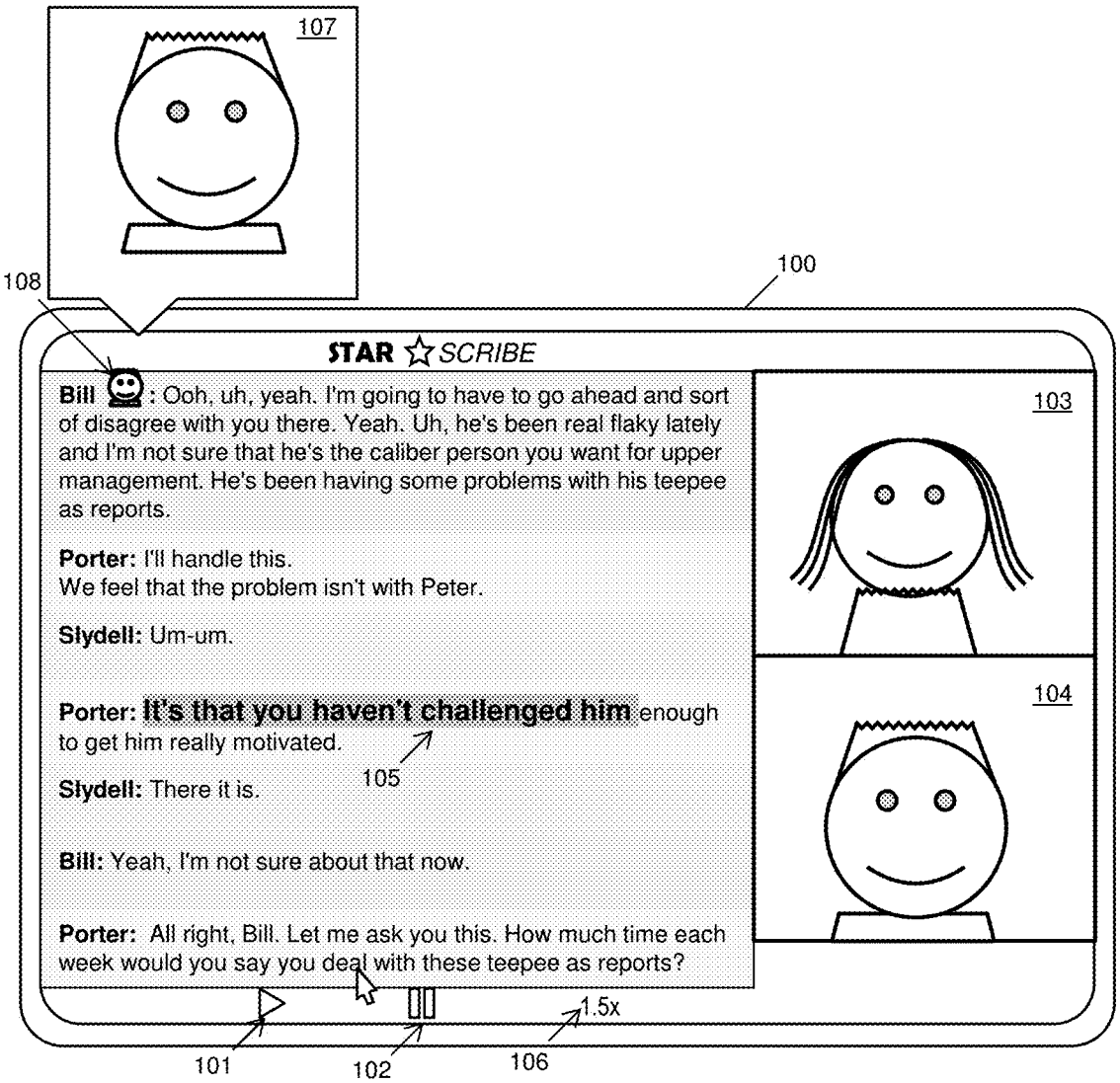
FIG. 10 shows a GUI for playback of a meeting with multimedia in synchronization with a transcript, according to one or more embodiments of the present subject matter.

FIG. 10 shows a GUI for playback of a meeting with multimedia in synchronization with a transcript. In a multi-party video conference, the system can store video information along with audio and transcripts. Video formats such as widely-supported Motion Picture Expert Group (MPEG), high-compression High Efficiency Video Codec (HEVC), or royalty-free AV-1 can be appropriate for various applications. According to some embodiments, video container files can include one or more video and audio streams with timestamps and synchronization information.

As shown in FIG. 10, an editing application can playback video under controls similar to the audio playback capabilities as described earlier. For example, one or more video streams can be shown in sections of the interface window that do not overlap the displayed transcript text. The videos can also be arranged in landscape orientation with long lines of text and video displays arranged horizontally above or below the text. Alternatively, the videos can be arranged in a portrait orientation with a larger number of short lines of text in a window with video images in a column on the left or right of the text.

For example, an editing application display 100 can have a play button 101, pause button 102, and windows 103 and 104 for displaying recorded video and audio of a first speaker and second speaker, from a recorded meeting session. According to some embodiments, an editor can use an editing application to review and correct a meeting transcript while playing the video and audio files.

According to some embodiments, as the video/audio is being replayed, the system can dynamically highlight the corresponding text strings 105 by altering their appearance. As shown in FIG. 10, the corresponding words can be shown in enlarged and bold font as the relevant words are simultaneously spoken in the audio.

According to some embodiments, the system can automatically scroll the transcript text in coordination with video being replayed. For example, by determining the relevant video or audio segment being replayed, the system can highlight the text strings corresponding to the segments. As an alternative, the system can show the text strings in a ticker style. According to some embodiments, the system can anticipate and highlight the upcoming text strings, for example, display them only when they are spoken.

According to some embodiments, the automatic scrolling feature is configurable, meaning it can be switched on/off or personalized to meet the editor's preference. For example, the highlighted text can be based on a line-by-line basis or a word-by-word basis to help the editor to visually track the relevant texts. According to some embodiments, the automatic scrolling feature can be similar to the LiveLyrics feature of the SoundHound app, which displays lyrics in synchronization with ambient playing music.

According to some embodiments, a speed option 106 can accelerate or slow down the speed of the playback. For example, the playback speed can be set as 1.5× of normal speed to enable a quicker replay. For another example, the playback speed can be set as 0.5× of normal speed so that the editor can view the video carefully. In response to the changed playback speed, the displaying speed of relevant text strings can be adjusted on display 100.

According to some embodiments, during a speaker's conversation turn, the speaker's video window can be highlighted by a surrounding rectangle. The rectangle can move to the alternate video window for the next speaker change. If a third speaker is in turn to talk, the application can switch to highlight the third speaker's video window.

According to some embodiments, the system can, via an editing application, enable playback of a selected speech turn, e.g., by playing corresponding timestamped segments. According to some embodiments, the system can embed hyperlinks within the text strings, wherein such hyperlinks are associated with the corresponding video segments. After receiving a selection of a specific hyperlink by an editor, the system can enable playback of relevant video/audio streams.

According to some embodiments, the system can provide a configuration option to allow an editor to selectively play or listen to a selected speaker's video. As an alternative, the system can allow the editor to play or watch a mixture of all speakers' videos.

According to some embodiments, one type of metadata can be repository image or video data. For example, the transcript can incorporate screenshots or images of video streams to represent the meeting content. The transcript can also incorporate short, animated files to summarize the video's content. According to some embodiments, the screenshots/images or the animated files are associated with the corresponding audio and/or video segments. According to some embodiments, the repository screenshots/images and/or the animated files can be displayed in a grid, wherein a selection of images in the grid can lead to a playback of the relevant audio/video segments.

As shown in FIG. 10, the system can capture screenshots of the conference images to represent the video content. Such indicative screenshots can be incorporated into the transcript to allow an efficient review of the meeting content. For example, as shown in FIG. 10, the system can generate a screenshot 107 of Bill's video window 104, which can be combined with Bill's transcribed text strings. According to some embodiments, screenshot 107 can be shown as an icon 108 next to Bill's name. An editor can click on icon 108 to view the full screenshot 107 without the need to watch the video itself.

According to some embodiments, the system can omit the video playback option altogether, leaving only the transcript with incorporated meeting screenshots. This approach can both allow the editor to save time by skipping reviewing the full video conference and reduce the storage requirements for a video conference.

Various mechanisms can be adopted to optimize the image-enriched transcript. For example, the system can automatically capture screenshots at a predetermined frequency, e.g., every 30 seconds. In another example, to capture the representative image of the video, the system can detect pixel changes on the screen, count them, and determine that the number of pixel changes is greater than a threshold. The threshold can be empirically predetermined, for example, at 5% of displayed pixels. The threshold can also be dynamically adjusted to make sure that important information is archived by the screenshots, for example, a higher threshold for a continuous headshot-style speaker view, and a lower threshold for a slide-view of a presentation.

According to some embodiments, a speech-enabled interface can be adopted to enable the user to take screenshots by voice commands. The system can, via a speech recognition or phrase spotting model, to detect a meeting participant speaking a key phrase such as "screenshot now." In response to the command, the system can capture a screenshot of the video window, or as an alternative, directly save an image from the video streams, both of which can be properly timestamped so that they can be archived chronologically. In addition, other user inputs, such as via a mouse, a foot pedal, or a keyboard command, can prompt the system to capture the screenshot or save an image.

In addition, the captured screenshots can be timestamped so that they can be embedded or associated with the corresponding text strings and video/audio segments. Exemplary image file formats can be in bitmaps, Joint Picture Experts Group (JPEG), Portable Network Graphics (PNG), or other such formats. According to some embodiments, the image files can be linked to the original video/audio segments. Accordingly, an editor can click a selected screenshot or an icon of it to enable a display of the corresponding text strings and/or a replay of the corresponding video/audio segments.

According to some embodiments, in addition to the transcript, the system can generate and display a grid of screenshots of the video conference. The grid of screenshots can comprise a plurality of sample images that indicate the content of the conference. According to some embodiments, an editor can click a selected screenshot in the grid to view and edit the relevant content, for example, a corresponding portion of the transcript or a snippet of a video/audio.

Furthermore, in addition to static screenshots, the video content samples can be dynamic. According to some embodiments, the system can capture a plurality of screenshots of video streams with respective timestamps and generate animated videos based on the screenshots. For example, an animated GIF file can represent a much longer video. According to some embodiments, the system can directly save images from the video conference file, e.g., at a predetermined frequency, to generate an animated video file. Accordingly, to some embodiments, a controlled frequency of image capturing, e.g., every 5-10 seconds, can be implemented to make the video file smaller and more manageable.

Animated video file can be linked with the corresponding portion of the transcript or a snippet of a video/audio. Accordingly, an editor can click an animated video file and trigger a display of the relevant transcript and playback of the video/audio content.

Figure 11A:
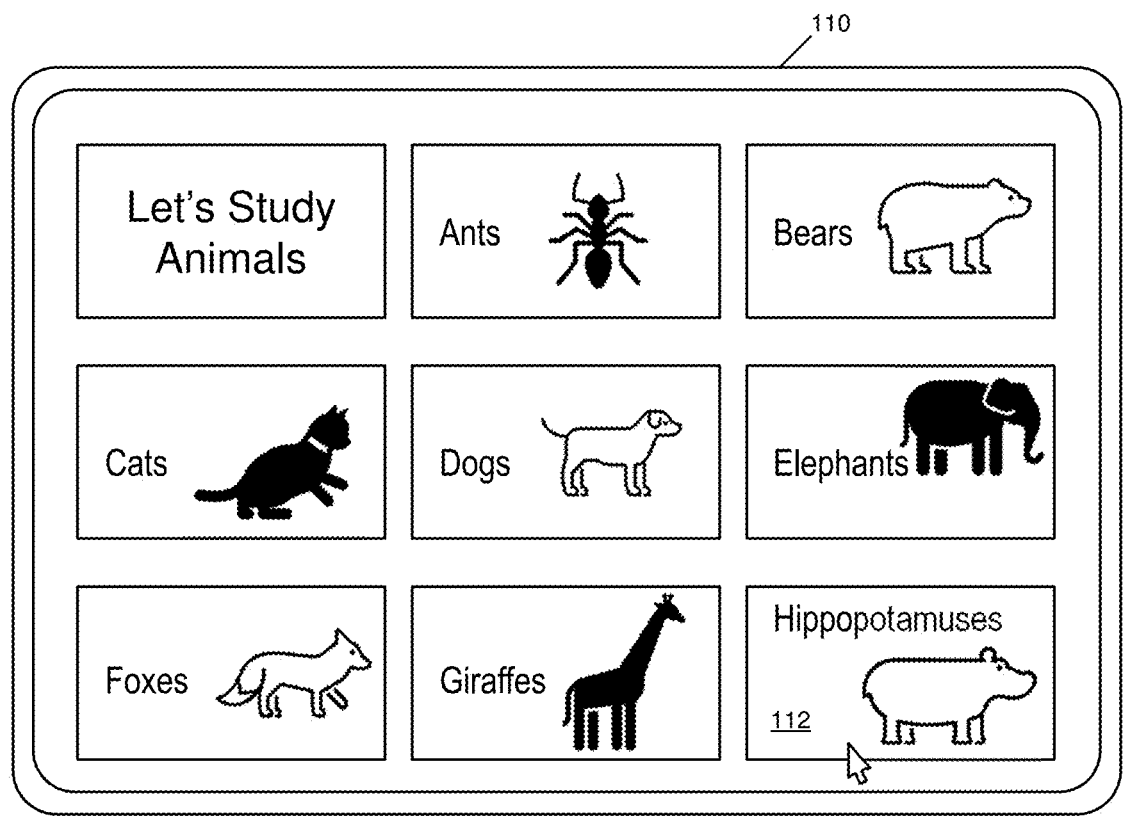
FIG. 11A shows an exemplary screen view of a grid comprising screenshots of video images of a meeting, according to one or more embodiments of the present subject matter.

FIG. 11A shows an exemplary screen view of an image grid 110 comprising screenshots of video images of a meeting with a shared screen view of presentation slides about animals. According to some embodiments, the image grid 110 can be integrated into a transcript of the lecture, for example, as an image repository. According to some embodiments, the image grid 110 can be an individual file that can be used to gain a quick glance and review of the lecture.

As shown in FIG. 11A, the image grid 110 can comprise representative screenshots taken from a screen shared during the lecture about animals. For example, the hippopotamuses sample image 112 can represent the audio/video content related to the section of the lecture that occurred while a slide about hippopotamuses was displayed. According to some embodiments, the hippopotamuses sample image 112 is a screen shot of the relevant content.

By clicking on the hippopotamuses sample image 112, a viewer or an editor can view the corresponding video/audio segments. According to some embodiments, the viewer can also review the relevant transcript.

Figure 11B:
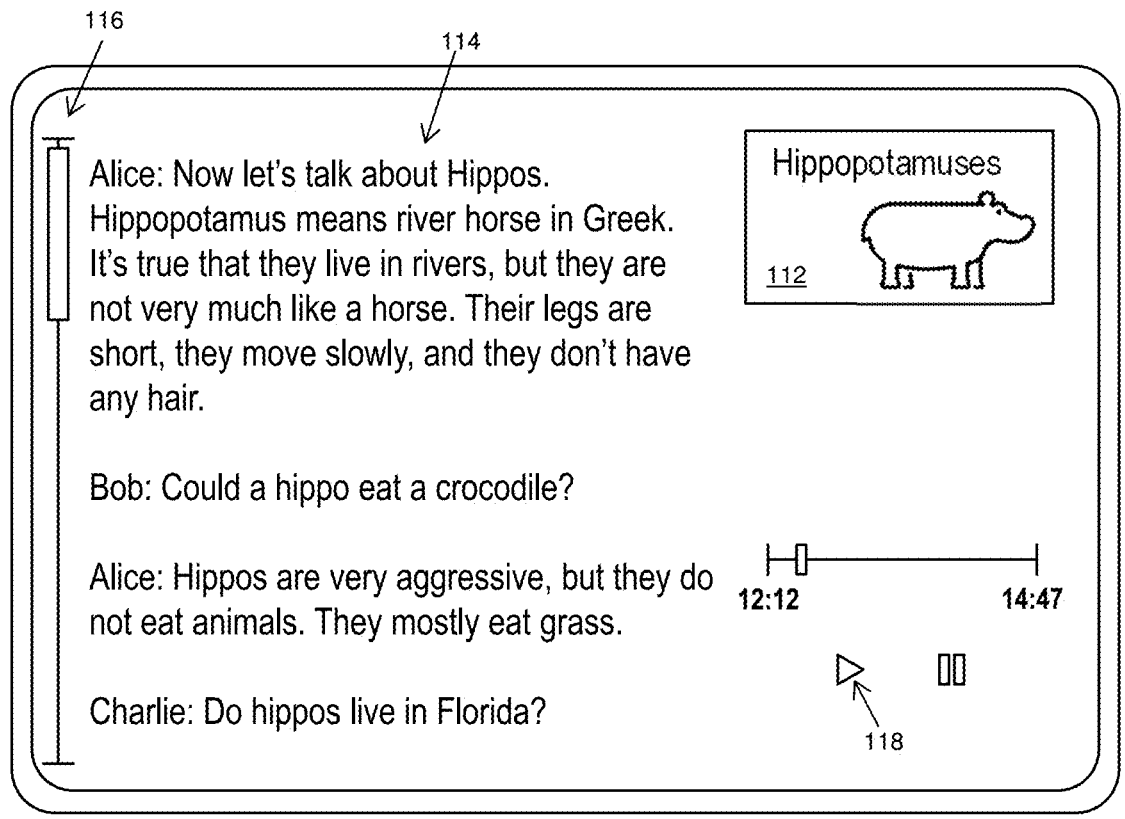
FIG. 11B shows an exemplary screen view following a selection of a screenshot in the grid of FIG. 11A, according to one or more embodiments of the present subject matter.

FIG. 11B shows an exemplary screen view following a selection of the hippopotamuses sample image 112 in the grid of FIG. 11A. After receiving a selection of the sample image 112, the system can display the corresponding text transcript 114, the relevant timestamped audio/video segments, and a text slider bar 116 to allow the editor to select a different portion of the transcript. According to some embodiments, a plurality of control options 118 can be used to control the playback, such as play, or pause, or accelerate.

According to some embodiments, the system can indicate that the hippopotamuses sample image 112 can represent the meeting from time 12:12 to 14:47. According to some embodiments, clicking the sample image 112 can lead to a full playback of the relevant video, e.g., from time 12:12 to 14:47. Alternatively, clicking sample image 112 can lead to playback of a short animated file based on the original video.

FIG. 12 shows an exemplary replacement of the text due to transcription errors or customer-specific common phrases. As shown in FIG. 12, an editing application can show the names of identified speakers, e.g., Slydell, Porter, and Bill. According to some embodiments, each speaker's transcribed texts can have a distinctive background color that makes them easily identifiable.

According to some embodiments, an editor can highlight a segment of erroneous text 121 with one color, such as purple. Simultaneously, the transcript viewing application can display all other occurrences of the same highlighted text 123 highlighted with another distinctive background color, such as yellow. After selecting the text, a pop-up box 122 can appear, pre-populated with the selected text. The editor can edit the text in the box. According to some embodiments, when the editor presses Enter, the editing application or server can replace the selected text with the edited text. When the editor presses Shift-Enter, the system can replace all instances of the selected text with the edited text in a so-called global replacement.

The global replacement can promptly implement a change in the transcript. For example, a transcript with many instances transcribed as "co vid 19" can be instantly replaced with the domain-specific term "COVID-19" in a single edit. In the example of FIG. 12, the company-specific acronym, "TPS," is repeatedly incorrectly transcribed as "teepee as." In this example, instances of "teepee as" are being replaced by "TPS." Besides the pop-up box with "Enter" and "shift-Enter", other search-and-replace user interfaces can also be adopted by the system.

According to some embodiments, for future uses, the system can automatically save, or prompt the user to save, a preferred text over the originally transcribed text in a text replacement dictionary. When the system recognizes the originally transcribed text, it can automatically replace it with the preferred text. This approach would reduce or avoid the occurrence of mistranscription over the same phrase, such as "TPS."

Figure 13:
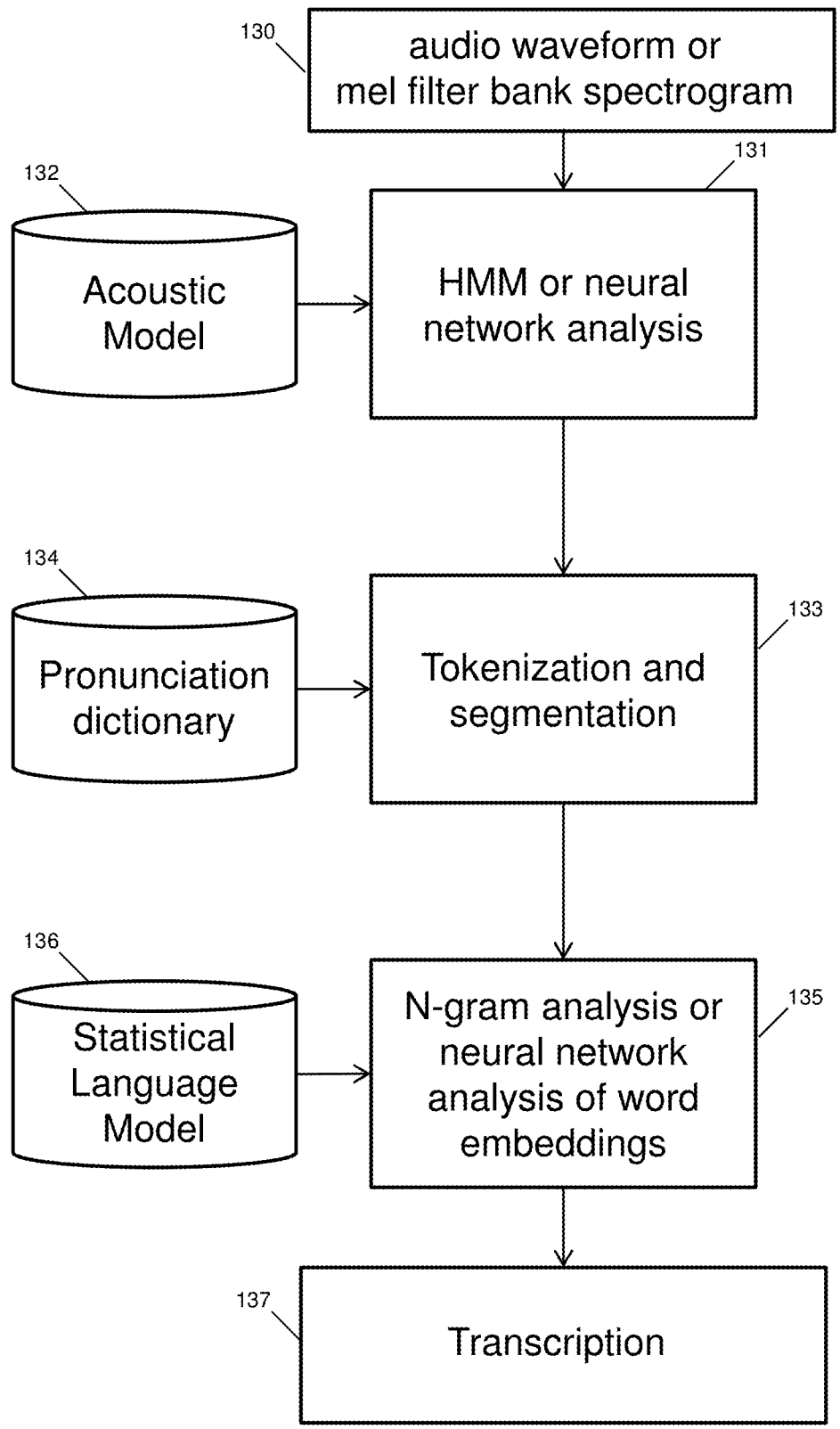
FIG. 13 shows an exemplary process of automatic speech recognition, according to one or more embodiments of the present subject matter.

FIG. 13 shows an exemplary process of speech recognition with an automatic speech recognition (ASR) system. According to some embodiments, a Hidden Markov Model (HMM) or neural network acoustic analysis 131 can adopt an acoustic model 132 to process input audio streams either in the format of sampled audio waveform data 130 or such data processed to compute a Mel filter bank spectrogram. The result of the acoustic processing is one or more phoneme sequence hypotheses and, for each one, a probability score of it being correct.

By tokenization and segmentation 133, the speech recognition system can determine sequences of words in a text replacement dictionary 134 that can match each phoneme sequence hypothesis. Each such sequence is a transcript of words. There can be more than one transcript for each phoneme sequence, such as "I scream" and "ice cream," which have the same phoneme sequence.

Next, a statistical language model (SLM) 136 can conduct further analysis 135 to compute the probability of each word sequence. Some sequences, such as "ice cream cone", are statistically more likely than others, such as "I scream cone." Sequences of N number of words and known as N-grams. The speech recognition system can compute N-gram statistics from corpora of linguistic data. Alternatively, a neural network, such as one trained on word embeddings, can compute the probability of word sequences. At the end of the process, the output is a transcript 137 with the most likely combination of acoustic score and statistical language model probability.

According to some embodiments, when mistranscriptions of domain-specific words, acronyms, or other N-grams are corrected, the system can add these words or phrases to a text replacement dictionary. The system can further analyze the context of those words, acronyms, or other N-grams and compute probabilities of those sequences. For example, if the phrase "file your TPS report" often occurs in a company's transcripts, then that transcription of TPS would likely be chosen instead of "teepee as."

A statistical language model based on word embeddings can be more accurate than a simple n-gram based statistical language model because the word embedding-based statistical language model would give similar embedding vector scores to the words "car" and "automobile".

According to some embodiments, the system can adopt a domain-specific language model. It can be implemented as a specialized layer within a neural network or specialized rescoring of an N-gram SLM probability score. A domain-specific language model can enable a system to use an SLM trained on a general corpus of linguistic data and still provide accurate transcription for the specific terminology of a specific application, company, classroom, or individual service subscriber.

Figure 14A:
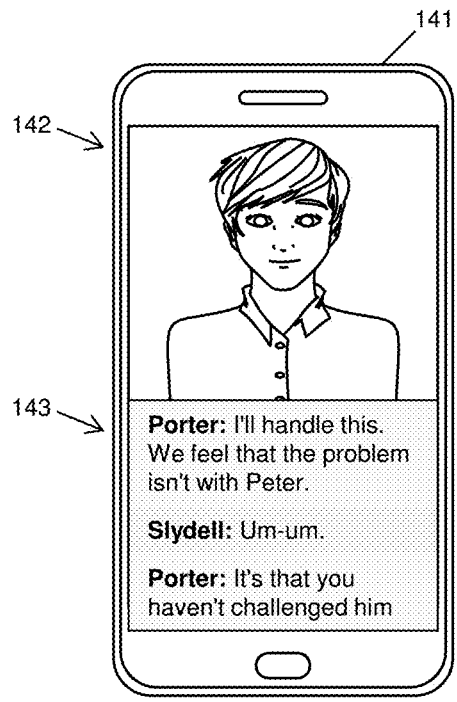
FIG. 14A shows a real-time view of a meeting with automatic transcription on a mobile device, according to one or more embodiments of the present subject matter.

FIG. 14A shows a real-time view of a meeting with automatic transcription on a mobile device. The present subject matter can be implemented by various terminal devices that have at least one microphone for receiving audio streams and at least one network interface for wireless connection. Examples of such a terminal device can be a mobile phone or a smart phone, a laptop, a desk computer, a wearable device such as smart glasses, a personal digital assistant, a tablet, or an automobile. Support for such devices can be implemented with hypertext transport protocol (HTTP) renderings using "viewport" meta tags appropriate for the screen size and orientation of the corresponding devices.

As shown in FIG. 14A, mobile device 141 can comprise one or more microphones that are configured to receive voice audio of a speaker and generate audio streams or audio data based on the voice audio. Such audio data can comprise time-series measurements, such as time series pressure fluctuation measurements and/or time series frequency measurements. For example, one or more channels of Pulse Code Modulation (PCM) data may be captured at a predefined sampling rate where each sample is represented by a predefined number of bits. Audio data may be processed following capture, for example, by filtering in one or more of the time and frequency domains, by applying beamforming and noise reduction, and/or by filtering and normalization. In one case, audio data may be converted into measurements over time in the frequency domain by performing the Fast Fourier Transform to create one or more frames of spectrogram data. According to some embodiments, filter banks may be applied to determine values for one or more frequency domain features, such as Mel-Frequency Cepstral Coefficients. Audio data as described herein for speech recognition may comprise a measurement made within an audio processing pipeline.

According to some embodiments, a mobile device 141 can enable a conversation or meeting between at two or more meeting participants. The mobile device 141 can display a view of at least one meeting participant 142 along with a live transcript 143 of the conversations. The live transcript 143 can comprise the speaker indicators, e.g., names and background colors, to make it easy to identify the speaker.

Figure 14B:
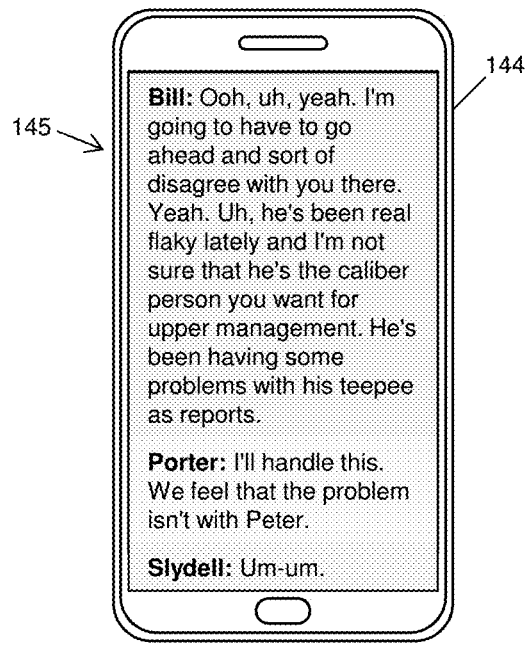
FIG. 14B shows reviewing a meeting transcript on a mobile device, according to one or more embodiments of the present subject matter.

FIG. 14B shows reviewing and editing a meeting transcript on a mobile device. According to some embodiments, an editing application of a mobile device 144 can enable viewing and editing of a transcript 145. According to some embodiments, the editing application can enable multiple editors to jointly and collaboratively edit the transcript 145.

Figure 15:
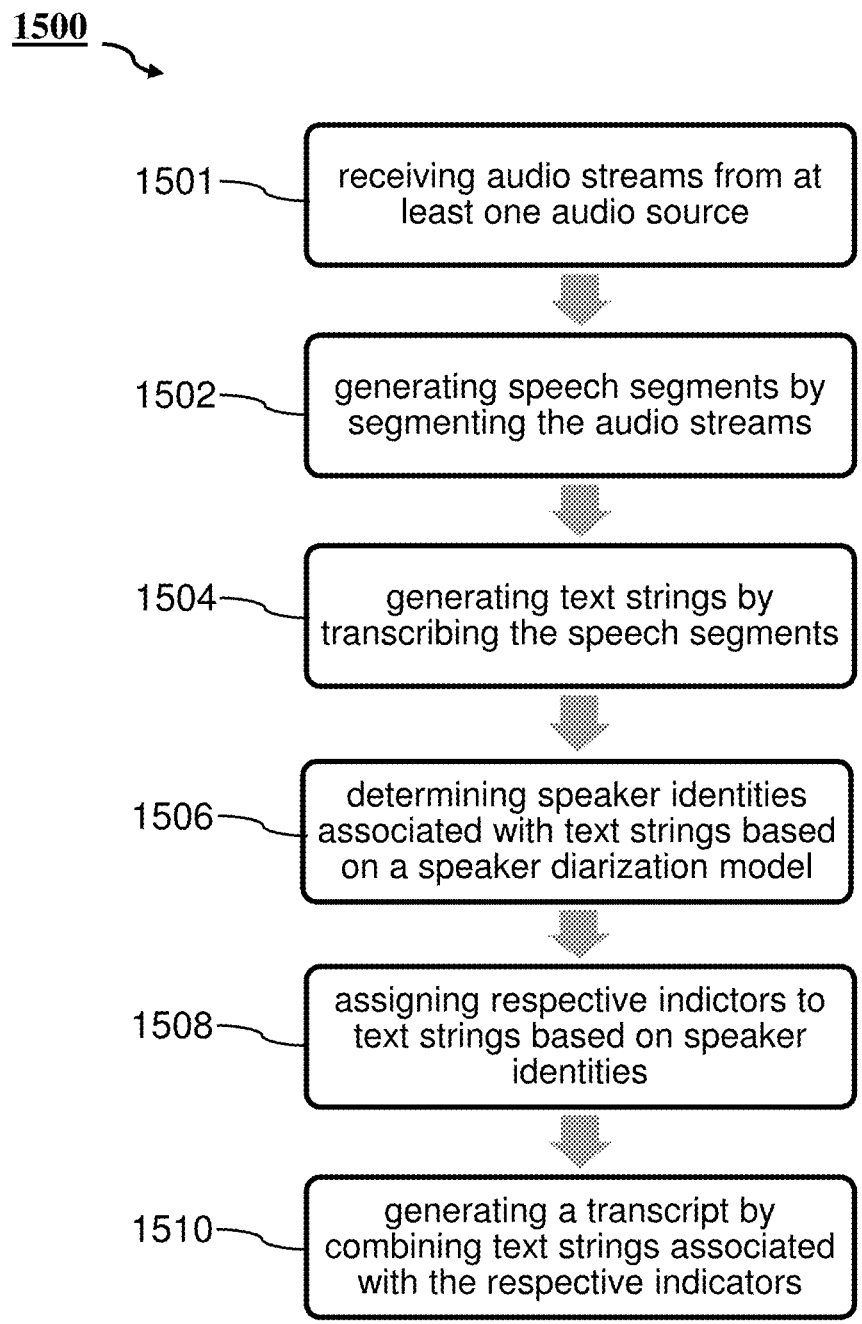
FIG. 15 is an exemplary flow diagram illustrating aspects of a method having features consistent with some implementations of the present subject matter.

FIG. 15 is an exemplary flow diagram illustrating the aspect of a method 1500 having features consistent with some implementations of the present subject matter. At step 1501, the system can receive audio streams from at least one audio source. According to some embodiments, the audio source could be one microphone to receive a single user's speech. According to some embodiments, the at least one audio source can be a plurality of microphones associated with different terminal or computing devices for a plurality of users or speakers. Each microphone or terminal device can be an audio source.

At step 1502, the system can generate speech segments by segmenting the audio streams, wherein the segmenting is based on voice activity detection. According to some embodiments, the system can process the audio streams by performing voice activity detection on the audio. Segmentation can split the audio stream into speaker homogeneous segments, or alternatively, to detect changes in speakers, also known as conversation turns. The system can segment the audio streams based on the detected voice activity data. It can further timestamp each audio segment by marking the beginning and end or duration of each segment. According to some embodiments, the system can further preprocess the audio data, for example, by filtering out the background noise.

At step 1504, the system can generate a plurality of text strings by transcribing the speech segments with a speech recognition system. According to some embodiments, the transcription at step 1504 and the diarization at step 1506 can be parallel to each other. Alternatively, the diarization at step 1506 can be processed before the transcription at step 1504.

A speech recognition system can be an Automatic Speech Recognition and natural language understanding system that is configured to infer at least one semantic meaning of a voice command based on various statistical acoustic and language models and grammars. According to some embodiments, the speech recognition system can comprise at least one acoustic model. The speech recognition system can further comprise one or more pronunciation models and language models for natural language processing.

An acoustic model can be a statistical model that is based on hidden Markov models and/or neural network models, which are configured to infer the probabilities of phonemes in the audio. Examples of such acoustic models comprise convolutional neural networks (CNN) and recurrent neural networks (RNN) such as long short-term memory (LSTM) neural networks or gated recurrent units (GRU) and deep feed-forward neural networks. Phoneme probabilities are outputs that can be subject to word tokenization and statistical analysis by language models to create transcripts.

At step 1506, the system can determine a plurality of speaker identities associated with the plurality of text strings based on a speaker diarization model. A speaker diarization model can comprise one or more speaker diarization algorithms that are configured to calculate the number of speakers in the audio streams and determine the identities of each speaker if available. When the identities of the speakers are available, the system can assign user specific indicators such as speaker names to label their transcribed texts; when the identities of the speakers are not available, the system can assign general indicators, such as "Speaker 1", "Speaker 2" to distinguish their transcribed texts.

The speaker diarization model can utilize one or more diarization factors to determine the speaker identities. Examples of such diarization factors include audio channel data, acoustic beamforming data, speech feature vectors data, speaker visual data, and extrinsic user data. According to some embodiments, different weights can be assigned to each factor based on the totality of the circumstances.

At step 1508, the system can assign respective indicators to the plurality of text strings based on the plurality of speaker identities, wherein text strings associated with one speaker are assigned to the same indicator. According to some embodiments, the respective indicators comprise at least one of a speaker avatar, a speaker name, or a speaker color.

At step 1510, the system can generate a transcript by combining the plurality of text strings associated with the respective indicators. According to some embodiments, the transcript can comprise instant transcription of live conversations, which can be continuously updated in real-time with the ongoing conversations. In addition, various metadata can be incorporated into the transcript to improve its readability and functionality.

For example, the transcript can have speaker diarization data with multiple speaker indicators, such as speaker names, speaker colors. The transcript can have embedded hyperlinks that correlate the transcribed texts with the corresponding audio segments. The transcript can further incorporate screenshots of video streams accompanying the audio streams to reflect the video's content. The transcript can also incorporate short, animated files to summarize the video's content. According to some embodiments, the screenshots or the animated files are associated with the corresponding audio and/or video segments. Other types of metadata, such as text formats, playback controls, can also be incorporated to enrich the transcript.

Figure 16:
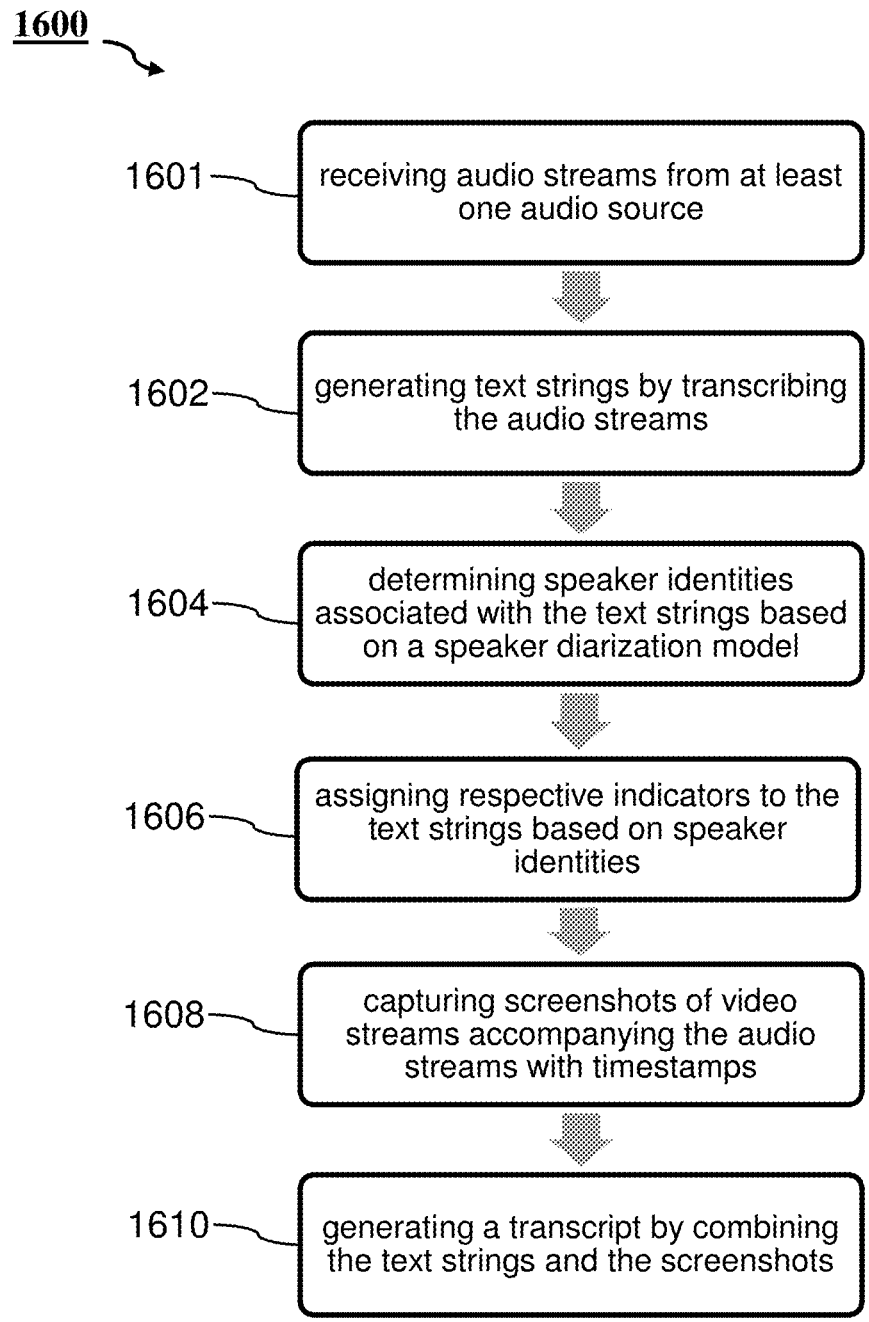
FIG. 16 is another exemplary flow diagram, including capturing screenshots, illustrating aspects of a method having features consistent with some implementations of the present subject matter.

FIG. 16 is another exemplary flow diagram illustrating a method 1600 having features consistent with some implementations of the present subject matter. At step 1601, the system can receive audio streams from at least one audio source. According to some embodiments, the audio source could be one microphone to receive a single user's speech. According to some embodiments, the at least one audio source can be a plurality of microphones associated with different terminal or computing devices for a plurality of users or speakers. Each microphone or terminal device can be an audio source.

At step 1602, the system can generate a plurality of text strings by transcribing the audio streams with a speech recognition system. The system can generate a plurality of text strings by speech segmentation and transcribing the speech segments with a speech recognition system. According to some embodiments, the speech recognition system can comprise one or more acoustic models, pronunciation models, and language models. A speech recognition system can also be configured to infer at least one semantic meaning of an audio recording based on grammars.

At step 1604, the system can determine a plurality of speaker identities associated with the plurality of text strings based on a speaker diarization model. According to some embodiments, the speaker diarization model can utilize multiple diarization factors to determine the speaker identities. The diarization factors include, for example, audio channel data, acoustic beamforming data, speech feature vectors data, speaker visual data, and extrinsic user data.

At step 1606, the system can assign respective indicators to the plurality of text strings based on the plurality of speaker identities, wherein text strings associated with one speaker are assigned to the same indicator. According to some embodiments, the respective indicators comprise at least one of a speaker avatar, a speaker name, or a speaker color.

At step 1608, the system can capture screenshots of video streams accompanying the audio streams with timestamps based on a common clock. According to some embodiments, the system can incorporate repository screenshots or images of the video conference to enrich the transcript. For example, the system can capture screenshots of the conference images to represent the video content. Such indicative screenshots can be incorporated into the transcript to allow an efficient review of the meeting content. As an alternative, the system can directly split images from the video streams to represent a view of the video conference.

Both static and dynamic image data can be incorporated into the transcript as metadata. According to some embodiments, the system can automatically capture screenshots or save an image from the video streams at a predetermined frequency, e.g., every 30 seconds. In another example, to capture the representative image of the video, the system can detect pixel changes on the screen, count them, and determine that the number of pixel changes is greater than a threshold, which can be predetermined or dynamically adjusted.

In addition, the captured screenshots can be timestamped so that they can be embedded or associated with the corresponding text strings and video/audio segments. According to some embodiments, the image files can be linked to the original video/audio segments. Accordingly, an editor can click a selected screenshot or an icon of it to enable a display of the corresponding text strings and/or a replay of the corresponding video/audio segments.

According to some embodiments, in addition to the transcript, the system can generate and display a grid of screenshots of the video conference. The grid of screenshots can comprise a plurality of sample images that indicate the content of the conference. According to some embodiments, an editor can click a selected screenshot in the grid to view and edit the relevant content, for example, a corresponding portion of the transcript or a snippet of a video/audio.

Furthermore, the video content samples can be dynamic. According to some embodiments, the system can generate animated videos based on screenshots or sliced images. For example, an animated GIF file can represent a much larger meeting video.

Similarly, the animated video file can be linked with the corresponding portion of the transcript or a snippet of a video/audio. Accordingly, an editor can click an animated video file and trigger a display of the relevant transcript and playback of the video/audio content.

According to some embodiments, the system can capture a screenshot, save an image or create a video sample upon a user's command. For example, a speech-enabled interface can be used to enable the user to take screenshots by voice commands. In addition, other user inputs, such as via a mouse, a foot pedal, or a keyboard command, can prompt the system to capture the screenshot or save an image.

At step 1610, the system can generate a transcript by combining the plurality of text strings associated with the respective indicators and the screenshots. According to some embodiments, the instantly generated transcript can be labeled with different types of metadata to improve its readability and functionality.

According to some embodiments, one type of metadata can be text format data. The system can adopt various format features to distinguish different speaker's content, e.g., text color changes at the switch between conversation turns or highlight a portion of the transcript. In addition, the spacing between text strings can indicate the amount of break time between two sentences. According to some embodiments, overlapping talks can lead to overlapping text strings or reduced spacing between the strings.

According to some embodiments, one type of metadata can be speaker diarization data. The transcript can cluster and label the text strings under multiple speaker indicators, such as speaker names, speaker colors.

According to some embodiments, one type of metadata can be playback control data. For example, the transcript can have embedded hyperlinks that correlate the transcribed texts with the corresponding audio/video segments. Furthermore, the system can provide a plurality of control options, e.g., accelerate or skip, to allow a convenient review of the transcript and the audio/video.

According to some embodiments, one type of metadata can be embedded hyperlink data. For example, the system can analyze semantic information and create embedded hyperlinks to look up related information in the transcript. The system can identify a word or a key phrase within a text string and present the word/key phrase as a hyperlink anchor corresponding to a URL, which can provide additional information about the work or key phrase.

According to some embodiments, the identified word or key phrase as the embedded hyperlink anchor can further comprise an argument in the URL when text adjacent to the key phrase matches a pattern corresponding to an argument. According to some embodiments, the system can identify an n-gram text as having a low frequency within a language model and present the n-gram text as a hyperlink anchor corresponding to a URL associated with a definition of it.

According to some embodiments, the system can dynamically highlight the corresponding text strings that are being replayed, for example, by altering their appearance or showing in enlarged and bold font as the relevant words are simultaneously spoken in the audio.

According to some embodiments, the system can automatically scroll the transcript text in coordination with audio/video being replayed. For example, by determining the relevant audio segments being replayed, the system can highlight the text strings corresponding to the segments. As an alternative, the system can show the text strings in a ticker style. According to some embodiments, the system can anticipate and highlight the upcoming text strings, for example, display them only when they are spoken.

Figure 17:
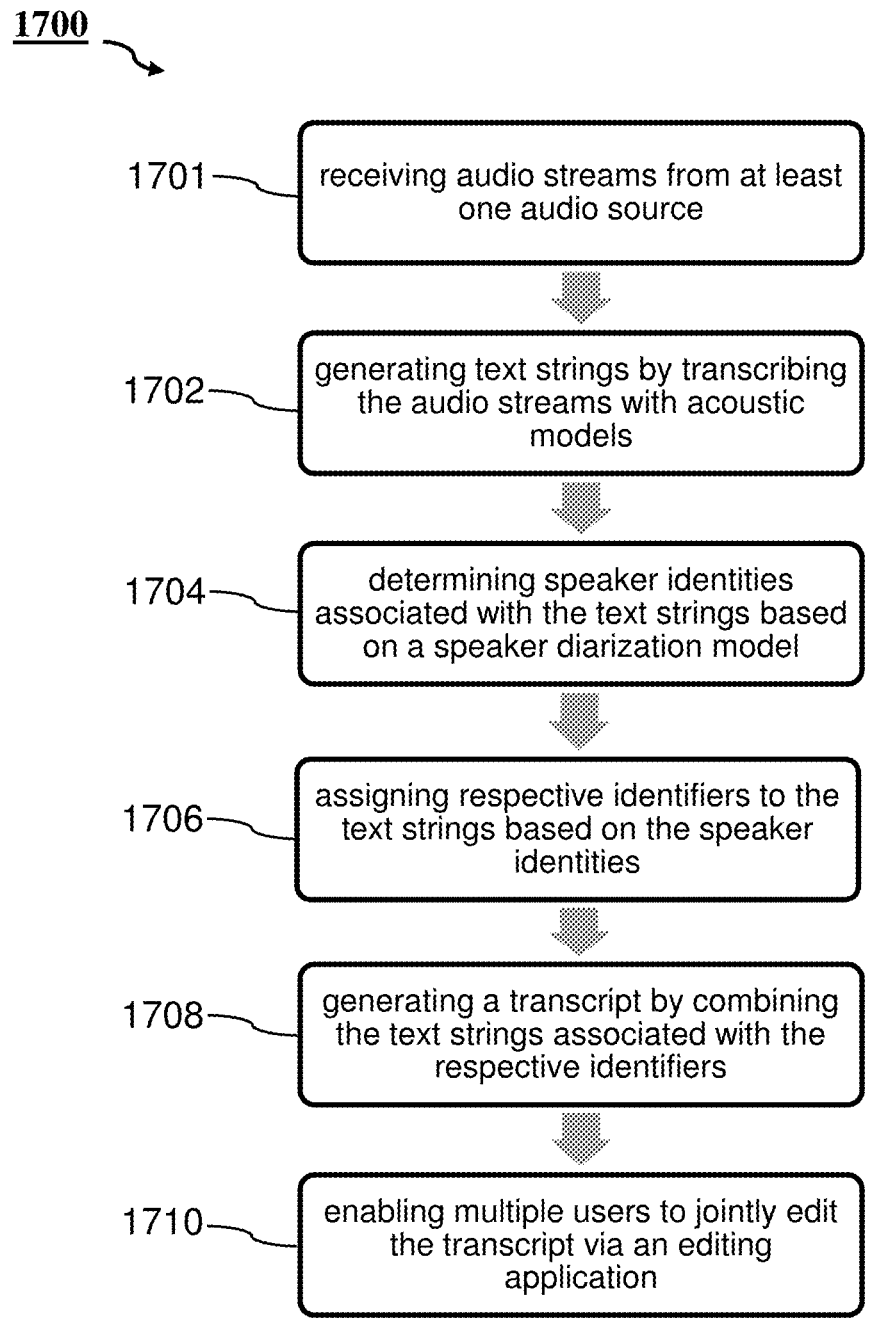
FIG. 17 is another exemplary flow diagram, including multi-user editing, illustrating aspects of a method having features consistent with some implementations of the present subject matter.

FIG. 17 is another exemplary flow diagram illustrating a method 1700 having features consistent with some implementations of the present subject matter. As described herein, at step 1701, the system can receive audio streams from at least one audio source. At step 1702, the system can generate a plurality of text strings by transcribing the audio streams with acoustic models. At step 1704, the system can determine a plurality of speaker identities associated with the plurality of text strings based on a speaker diarization model. At step 1706, the system can assign respective indicators to the plurality of text strings based on the plurality of speaker identities, wherein text strings associated with one speaker are assigned to the same indicator. At step 1708, the system can generate a transcript by combining the plurality of text strings associated with the respective indicators.

At step 1710, the system can enable a plurality of users to jointly edit the transcript via an editing application. According to some embodiments, during joint editing of the transcript, the editing application is configured to identify a user with a unique marker displayed on the transcript. According to some embodiments, the editing application is configured to assign various editing permissions to the plurality of users. According to some embodiments, the editing application is configured to continuously update the transcript according to the audio streams in real-time. While two or more editors can jointly modify the stored transcripts, the system can, at the same time, push transcript changes to all terminals so that they can display the latest version of the transcripts.

According to some embodiments, the system can, via an editing application, enable a global replacement of a word or a phrase throughout the transcript. Furthermore, the system can automatically save, or prompt the user to save, a preferred text over the originally transcribed text in a text replacement dictionary. When the system recognizes the originally transcribed text, it can automatically replace it with the preferred text. According to some embodiments, a domain-specific language model can be configured to recognize an audio segment and correctly associate it with the preferred text transcription.

Figure 18A:
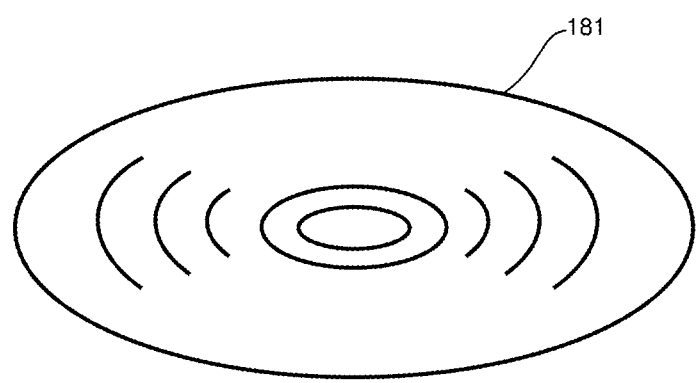
FIG. 18A shows a rotating disk non-transitory computer-readable medium, according to one or more embodiments of the present subject matter.

FIG. 18A shows an example non-transitory computer readable medium 181 that is a rotating magnetic disk. Data centers commonly use magnetic disks to store data and code comprising instructions for server processors. Non-transitory computer readable medium 181 stores code comprising instructions that, if executed by one or more computers, would cause the computer to perform steps of methods described herein. Rotating optical disks and other mechanically moving storage media are possible.

Figure 18B:
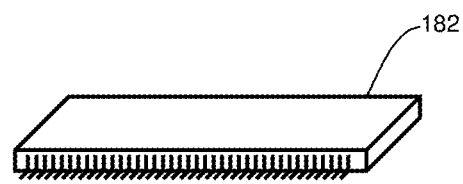
FIG. 18B shows a memory chip non-transitory computer-readable medium, according to one or more embodiments of the present subject matter.

FIG. 18B shows an example non-transitory computer readable medium 182 that is a Flash random access memory (RAM) chip. Data centers commonly use Flash memory to store data and code for server processors. Mobile devices commonly use Flash memory to store data and code for processors within system-on-chip devices. Non-transitory computer readable medium 182 stores code comprising instructions that, if executed by one or more computers, would cause the computer to perform steps of methods described herein. Other non-moving storage media packaged with leads or solder balls are possible.

Figure 19A:
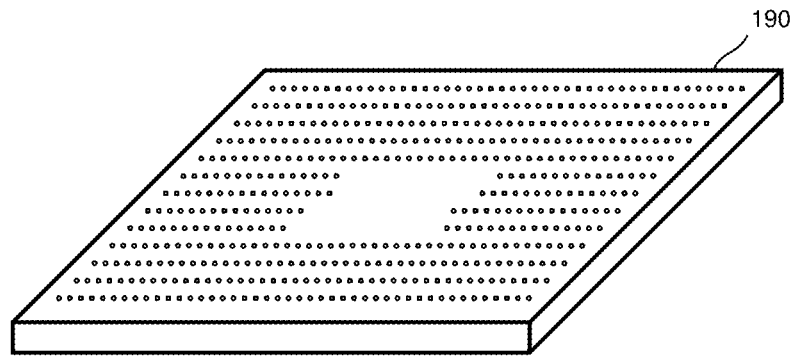
FIG. 19A shows a packaged system-on-chip, according to one or more embodiments of the present subject matter.

FIG. 19A shows the bottom side of a packaged system-on-chip device 190 with a ball grid array for surface-mount soldering to a printed circuit board. Various package shapes and sizes are possible for various chip implementations. System-on-chip (SoC) devices control many embedded systems and IoT device embodiments as described herein.

Figure 19B:
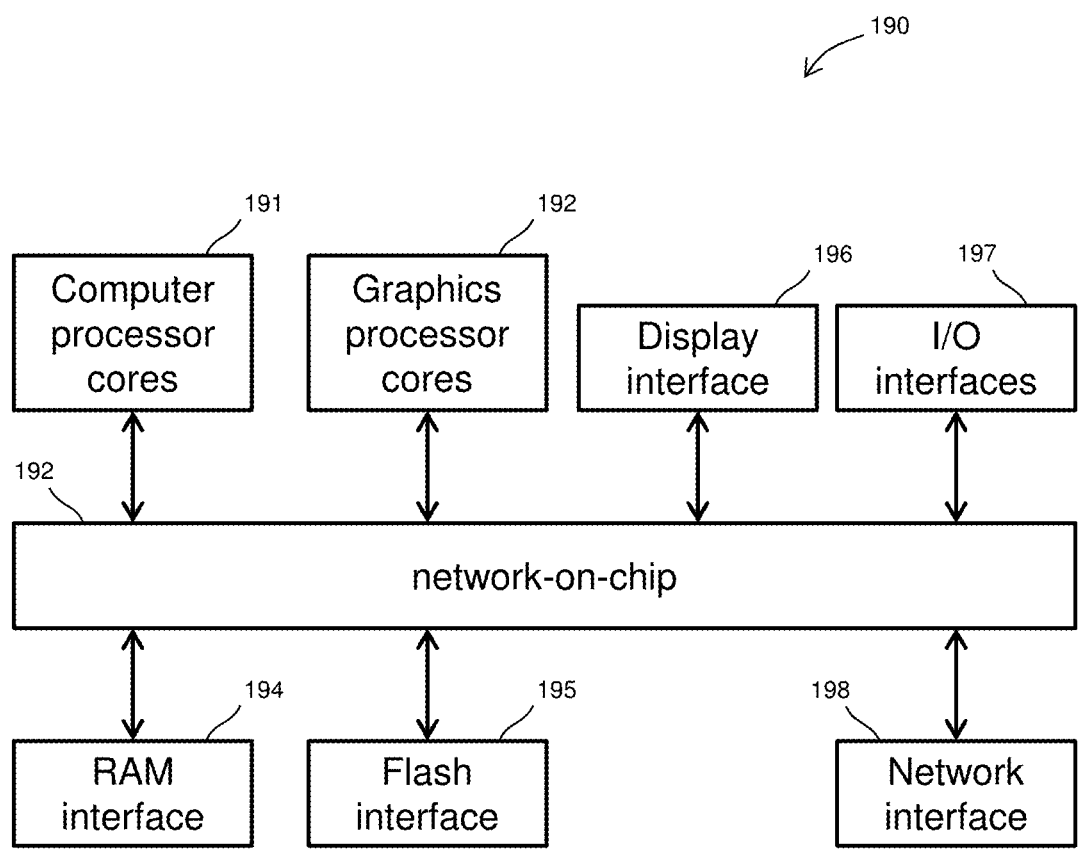
FIG. 19B shows a diagram of a system-on-chip, according to one or more embodiments of the present subject matter.

FIG. 19B shows a block diagram of the system-on-chip (SoC) 190. It comprises a multicore cluster of computer processor (CPU) cores 191 and a multicore cluster of graphics processor (GPU) cores 192. The processors connect through a network-on-chip 192 to an off-chip dynamic random access memory (DRAM) interface 194 for volatile program and data storage and a Flash interface 195 for non-volatile storage of computer program code in a Flash RAM non-transitory computer readable medium. SoC 190 also has a display interface 196 for displaying a GUI and an I/O interface module 197 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 190 also comprises a network interface 198 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 194 or Flash devices through interface 195, the CPU cores 191 and GPU cores 192 perform steps of methods as described herein.

Figure 20A:
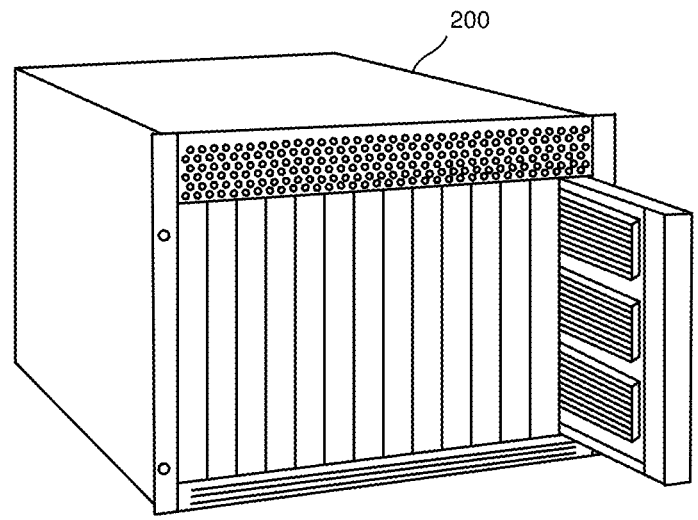
FIG. 20A shows a rack-based server, according to one or more embodiments of the present subject matter.

FIG. 20A shows a rack-mounted server blade multiprocessor server system 200 according to some embodiments. Server system X0 comprises a multiplicity of network-connected computer processors that run software in parallel.

Figure 20B:
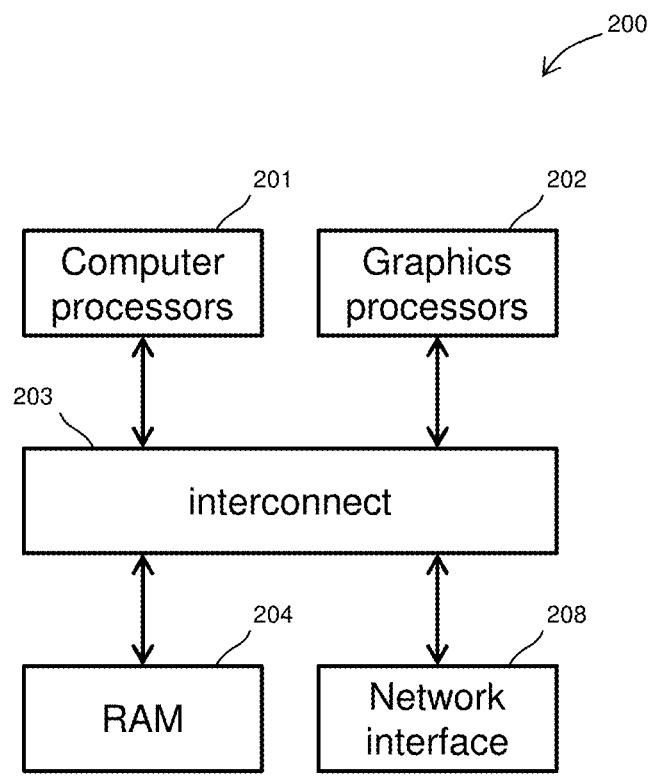
FIG. 20B shows a diagram of a rack-based sever, according to one or more embodiments of the present subject matter.

FIG. 20B shows a block diagram of the server system 200. It comprises a multicore cluster of computer processors (CPU) 201 and a multicore cluster of graphics processors (GPU) 202. The processors connect through a board-level interconnect 203 to random-access memory (RAM) devices 204 for program code and data storage. Server system 200 also comprises a network interface 208 to allow the processors to access the Internet. By executing instructions stored in RAM devices 204, the CPUs 201 and GPUs 202 perform steps of methods as described herein.

Several aspects of one implementation of the speech-controlled interaction with a host device via a mobile phone are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method for automatic conversation transcription, comprising:
    receiving audio streams from at least one audio source;
    receiving video streams associated with the at least one audio source;
    generating speech segments by segmenting the audio streams, wherein the segmenting is based on voice activity detection;
    generating a plurality of text strings by transcribing the speech segments with a speech recognition system;
    determining a plurality of speaker identities associated with the plurality of text strings based on a speaker diarization model;
    assigning respective indicators to the plurality of text strings based on the plurality of speaker identities, wherein text strings associated with one speaker are assigned to the same indicator;
    displaying, on a screen, the video streams accompanying the audio streams;
    detecting a number of pixel changes being greater than a threshold on the screen displaying the video streams;
    capturing screenshots of the video streams accompanying the audio streams with timestamps based on a common clock; and
    generating a real-time transcript by combining the plurality of text strings associated with the respective indicators and the screenshots according to the timestamps.

2. The computer-implemented method of claim 1, wherein the speaker diarization model is configured to utilize one or more diarization factors to determine the plurality of speaker identities.

3. The computer-implemented method of claim 2, wherein the one or more diarization factors comprise audio channel data.

4. The computer-implemented method of claim 2, when the one or more diarization factors comprise speech feature vectors data, the computer-implemented method further comprising:
    determining the distance between the speech feature vectors of a group of speech segments is below a threshold; and
    clustering the group of speech segments by assigning the same indicator to the group of speech segments.

5. The computer-implemented method of claim 2, wherein the one or more diarization factors comprise acoustic beamforming data.

6. The computer-implemented method of claim 2, wherein the one or more diarization factors comprise speaker visual data.

7. The computer-implemented method of claim 1, further comprising:
    embedding hyperlinks within the plurality of text strings, wherein the hyperlinks are associated with corresponding speech segments of the audio streams; and
    enabling, by receiving a selected hyperlink associated with a speech segment, a playback of relevant audio streams.

8. The computer-implemented method of claim 1, further comprising:
    timestamping the plurality of text strings according to a common clock;
    storing the timestamps associated with the text strings;

receiving a request from an editing application to play audio corresponding to a text string; and playing audio beginning at the timestamp corresponding to the requested text string.

9. The computer-implemented method of claim 8, further comprising:

displaying, on a screen, the transcript; and automatically scrolling through the plurality of text strings associated with audio streams being played.

10. The computer-implemented method of claim 1, further comprising:

upon detecting the number of pixel changes being greater than a threshold on the screen displaying the video streams, enabling screenshots capturing of the video streams.

11. The computer-implemented method of claim 1, further comprising:

displaying, on the screen, the screenshots of video streams in a grid, wherein the screenshots of video streams are configured to associate with corresponding text strings and to represent the content of the video streams;

receiving a selection of a screenshot in the grid;

displaying the corresponding text strings based on the selected screenshot; and playing audio associated with the corresponding text strings.

12. The computer-implemented method of claim 1, further comprising:

capturing a plurality of screenshots of video streams with respective timestamps based on a common clock;

generating a plurality of animated video files based on the plurality of screenshots;

displaying, on the screen, the plurality of animated videos in a grid, wherein the animated video are configured to associate with corresponding text strings and to represent the content of the video streams;

receiving a selection of an animated video file in the grid;

playing the selected animated video file on the screen;

playing audio associated with the selected animated video file; and displaying, on the screen, the corresponding text strings based on the selected animated video file.

13. A computer-implemented method for automatic conversation transcription, comprising:

receiving audio streams from at least one audio source;

receiving video streams associated with the at least one audio source;

generating a plurality of text strings by transcribing the audio streams with a speech recognition system;

determining a plurality of speaker identities associated with the plurality of text strings based on a speaker diarization model;

assigning respective indicators to the plurality of text strings based on the plurality of speaker identities, wherein text strings associated with one speaker are assigned to the same indicator;

displaying, on a screen, the video streams accompanying the audio streams;

detecting a number of pixel changes being greater than a threshold on the screen displaying the video streams;

capturing screenshots of the video streams accompanying the audio streams with timestamps based on a common clock; and generating a real-time transcript by combining the plurality of text strings associated with the respective indicators and the screenshots.

14. The computer-implemented method of claim 13, wherein the speaker diarization model is configured to utilize more than one diarization factor to determine the plurality of speaker identities.

15. The computer-implemented method of claim 13, further comprising:

upon detecting the number of pixel changes being greater than a threshold on the screen displaying the video streams, enabling screenshots capturing of the video streams.

16. The computer-implemented method of claim 13, further comprising:

displaying, on a screen, the screenshots of video streams in a grid, wherein the screenshots of video streams are configured to associate with corresponding text strings and to represent the content of the video streams;

receiving a selection of a screenshot in the grid;

displaying the corresponding text strings based on the selected screenshot; and playing audio associated with the corresponding text strings.

17. The computer-implemented method of claim 13, further comprising:

capturing a plurality of screenshots of video streams with respective timestamps based on a common clock;

generating a plurality of animated video files based on the plurality of screenshots; and displaying, on the screen, the plurality of animated videos in a grid, wherein the animated video are configured to associate with corresponding text strings and to represent the content of the video streams;

receiving a selection of an animated video file in the grid;

playing the selected animated video file on the screen;

playing audio associated with the selected animated video file; and displaying, on the screen, the corresponding text strings based on the selected animated video file.

18. The computer-implemented method of claim 13, further comprising:

generating speech segments by segmenting the audio streams, wherein the segmenting is based on voice activity detection;

embedding hyperlinks within the plurality of text strings, wherein the hyperlinks are associated with corresponding speech segments of the audio streams; and enabling, by receiving a selected hyperlink associated with a speech segment, a playback of relevant audio streams.

19. The computer-implemented method of claim 13, further comprising:

generating speech segments by segmenting the audio streams, wherein the segmenting is based on voice activity detection timestamping the plurality of text strings according to a common clock;

storing the timestamps associated with the text strings;

receiving a request from an editing application to play audio corresponding to a text string; and playing audio beginning at the timestamp corresponding to the requested text string.

20. The computer-implemented method of claim 19, further comprising:

displaying the transcript on the screen; and automatically scrolling through the plurality of text strings associated with audio streams being played.

* * * * *